United States Patent [19]

Lacey et al.

[11] Patent Number: 5,457,534
[45] Date of Patent: Oct. 10, 1995

[54] METHOD AND APPARATUS TO CALIBRATE INTENSITY AND DETERMINE FRINGE ORDER FOR INTERFEROMETRIC MEASUREMENT OF SMALL SPACINGS

[75] Inventors: Christopher Lacey, Gilford, N.H.; Edward W. Ross, Escondido, Calif.

[73] Assignee: Phase Metrics, San Diego, Calif.

[21] Appl. No.: 171,913

[22] Filed: Dec. 21, 1993

Related U.S. Application Data

[63] Continuation-in-part of Ser. No. 781,820, Oct. 23, 1991, Pat. No. 5,280,340.

[51] Int. Cl.⁶ .................................................. G01B 9/02
[52] U.S. Cl. ............................................. 356/357; 356/359
[58] Field of Search ................................. 356/355, 357, 356/358, 359, 360

[56] References Cited

U.S. PATENT DOCUMENTS

| | | |
|---|---|---|
| 4,293,224 | 10/1981 | Gaston et al. . |
| 4,593,368 | 6/1986 | Fridge et al. . |
| 4,627,733 | 12/1986 | Wada . |
| 4,630,926 | 12/1986 | Tanaka et al. . |
| 4,639,139 | 1/1987 | Wyant et al. . |
| 4,650,330 | 3/1987 | Fujita . |
| 4,832,489 | 5/1989 | Wyant et al. . |
| 4,931,630 | 6/1990 | Cohen et al. . |
| 4,948,251 | 8/1990 | Kondo . |
| 5,028,136 | 7/1992 | Murarka et al. . |
| 5,101,111 | 3/1992 | Kondo . |
| 5,218,424 | 6/1993 | Sommargren . |
| 5,285,252 | 2/1994 | Vareille et al. . |

FOREIGN PATENT DOCUMENTS 2-156105  6/1990  Japan .

OTHER PUBLICATIONS

G. L. Best et al.; "Precise Optical Measurements of Slider Dynamics"; *IEEE Transactions on Magnetics*, vol. MAG-22, No. 5, Sep. 1986, pp. 1017–1018.

T. Ohkubo et al.; "Accurate Measurement of Gas-lubricated Slider Bearing Separation Using Visible Laser Interferometry"; *Journal of Tribology Transactions of the ASME*, Oct. 1987, pp. 1–6.

D. L. Lipschutz; "Dynamic Measurement of Small Separations by a Light Interference Method"; *IEEE: Proceedings of the International Conference on Magnetic Recording*, London, Jul. 1964, pp. 87–90.

W. N. Hansen; "Electric Fields Produced by the Propagation of Plane Coherent Electromagnetic Radiation in a Stratified Medium"; Journal of the Optical Society of America, vol. 58, No. 3, Mar. 1968, pp. 380–390.

K. Tanaka et al.; "Measurements of Transient Motion of Magnetic Disk Slider"; *IEEE Transactions on Magnetics*, vol. MAG-20, No. 5, Sep. 1984, pp. 924–926.

(List continued on next page.)

*Primary Examiner*—Samuel A. Turner
*Attorney, Agent, or Firm*—Dennis H. Epperson

[57] ABSTRACT

The apparatus and method for measuring a small spacing down to contact uses an interferometric fringe intensity calibration to calibrate maximum and minimum intensity of two or more monochromatic or quasi-monochromatic interference patterns caused by a spacing between two articles, one of which is transparent. The intensity calibration is done by measuring maximum and minimum fringe intensity of each color while altering the spacing by at least ¼ of the wavelength of the light or other electromagnetic radiation being used. The calibration by changing spacing allows the fringe order to be calculated for each wavelength of the radiation being used. This calibration procedure allows the maximum and minimum intensity of the radiation to be known, as well as the fringe order of the interference patterns to be calculated. With the maximum and minimum intensities and the fringe orders known, the spacing is readily calculated from interferometric theory.

10 Claims, 8 Drawing Sheets

OTHER PUBLICATIONS

J. M. Fleischer et al.; "Infrared Laser Interferometer for Measuring Air–Bearing Separation"; *IBM J. Res. Develop.*, Nov. 1974, pp. 529–533.

A. Nigam; "A Visible Laser Interferometer for Air Bearing Separation Measurement to Submicron Accuracy"; *Journal of Lubrication Technology, Transactions for the ASME;* vol. 104, Jan. 1982, pp. 60–65.

Y. Mizoshita et al., "Dynamic Characteristics of a Magnetic Head Slider"; *IEEE Transactions on Magnetics;* vol. MAG–21, No. 5, Sep. 1985, pp. 1509–1511.

C. Lin; "Techniques for the Measurement of Air—Bearing Separation—A Review"; *IEEE Transactions on Magnetics,* vol. MAG–9, No. 4, Dec. 1973, pp. 673–677.

C. Lin et al.; "An Application of White Light Interferometry in Thin Film Measurements"; *IBM J. Res. Dev.* May 1972, pp. 269–276.

G. L. Best; "Comparison of Optical and Capacitive Measurements of Slider Dynamics"; *IEEE Transactions on Magnetics,* vol. MAG–23, No. 5, Sep. 1987, pp. 3453–3455.

S. Yamamoto et al.,; "Real Time Observation of Head—To—Medium Interface in Flexible Perpendicular Magnetic Recording Disc System"; publication and date unknown.

Sales Brochure; ProQuip FM8801; publication date unknown.

Sales Brochure; PPL Automatic Digital Flying Height Tester; publication date unknown.

Y. Mizoshita et al.; "Dynamic Characteristics of a Magnetic Head Slider"; *IEEE Transactions on Magnetics, vol. MAG–21, No. 5, Sep. 1985, pp. 1509–1511.*

M. Mizukawa et al.; "Study on Spherical Foil Bearing"; Bulletin of JSME, vol. 28, No. 243, Sep. 1985, pp. 2105–2111.

Sales Brochure; Dynamic Flying Height Tester; Phase Metrics; 6 pages; publication date unknown.

C. Lacey et al.; "A New Method for Measuring Flying Height Dynamically"; Phase Metrics; 1992, pp. 1–16.

1

METHOD AND APPARATUS TO CALIBRATE INTENSITY AND DETERMINE FRINGE ORDER FOR INTERFEROMETRIC MEASUREMENT OF SMALL SPACINGS

RELATED APPLICATION

This application is a continuation-in-part of patent application Ser. No. 07/781,820, filed Oct. 23, 1991, by inventor Christopher Lacey, now U.S. Pat. No. 5,280,340, and entitled "METHOD AND APPARATUS TO CALIBRATE INTENSITY AND DETERMINE FRINGE ORDER FOR INTERFEROMETRIC MEASUREMENT OF SMALL SPACINGS".

BACKGROUND OF THE INVENTION

The rapid increase in the operating speed of computers has led to significant demands on both data storage capacity and access speed. The hard disk drive has been steadily evolving and continues to offer a cost-effective solution to both capacity and speed requirements. Increases in data storage densities and miniaturization of disk drives have enabled even small portable computers to have access to large amounts of on-line disk storage.

In disk drives, head-to-media speeds are such that an air bearing is generated between the head and the disk. At increased speeds the air bearing separation increases. Thus, without means to counter the tendency to increase the head/media spacing, losses will occur.

Manufacturers of hard disk drives typically measure the flying height of all head/gimble assemblies before assembling them into drives in order to avoid reworking drives after assembly when they do not meet specifications. While head/media spacings in excess of 1 micron can be measured using monochromatic fringe counting techniques, spacings below 1 micron are measured using white light interferometry due to its greater resolution in the range of 250 to 750 nm. Constructive or destructive interference results in the generation of different color fringes which are compared to a Newton's color chart or analyzed by spectrometer. This technique is the current industry standard, however, at spacings of less than 150 nm, the colors wash together and cannot be interpreted with reasonable accuracy.

Various other techniques have been developed for the measurement of small spacings, however, their methods are still incapable of accurately measuring spacing down to contact. One example is U.S. Pat. No. 4,593,368 by Fridge et al. This patent describes the use of a computerized spectro-photometer to analyze the color of white light fringes produced at the interface of two surfaces, one of which is transparent, when subject to broad-band illumination. This measuring system and technique has the following disadvantages: 1) At very low spacing (less than $\lambda/5$) no distinct colored fringes are produced. Therefore, at this small spacing, relatively small changes in light intensity as a function of wavelength are measured by the computerized spectro-photometer. Since the measurable change in intensity as a function of wavelength (the color) is greatly reduced at spacings below $\lambda/5$, the signal-to-noise ratio of the measurement greatly decreases for such small spacings. 2) The spectro-photometer employed requires 0.05 seconds to acquire the intensity data for the spectrum of light being used for the measurement. The lengthy time required for data acquisition precludes dynamic measurement of spacing above 10 Hz.

In a method disclosed by Tanaka et al. (U.S. Pat. No. 4,630,926) an interferometer is used to dynamically measure head/disk spacing. A xenon light source with a monochrometer produces monochromatic light which is directed over the length of a slider which is inclined such that the spacing between a clear glass disk and the slider varies by more than $\lambda/4$. In such a case where the slider is incident with respect to the disk and the spacing varies by more than $\lambda/4$, at least one maxima and one minima of interferometric fringe intensity occurs. Tanaka et al. teach that at the maximum and minimum (extrema) of fringe intensity, two-beam and multi-beam interferometric theory yield the same spacing. Therefore, at the extrema, the simpler two-beam theory is used. Tanaka et al. also vary the wavelength of the light being used in order to 1) get fringe extrema and, therefore, spacing measurement at different points along the slider; and 2) verify which order fringe is being detected.

The system of Tanaka et al. is limited in that it cannot measure spacing below $\lambda/4$ of the monochromatic light being used and is too slow to measure air bearing resonances. Tanaka et al.'s system is clocked at a frequency of 15.8 kHz making is incapable of measuring typical air bearing resonances of 20 kHz or more.

Another method to measure slider/disk spacing is disclosed in Ohkubo et al.'s paper "Accurate Measurement of Gas-lubricated Slider Bearing Separation Using Visible Laser Interferometry" which was distributed as paper 87-Trib-23 by the American Society of Mechanical Engineers. This paper describes the basis of operation for the FM 8801 Laser-Based Flying Height Measuring System which is sold in the U.S.A. by ProQuip, Inc., Santa Clara, Calif. As described in Ohkubo et al.'s paper, the system uses a HeNe laser source. The beam from the laser goes through a beamsplitter where part of the beam is directed toward a reference photodetector which detects variation in the intensity of the laser source. The remaining part of the laser beam goes through a beam expander then through a lens which focuses the illumination onto the slider/glass disk interface. This illumination causes interference fringes which are focused onto a second measurement photodetector used for measuring intensity of the fringes. The measurement and reference signals from the two photodetectors are sent through amplifiers then into a divider circuit such that the interference signal is normalized to the input laser intensity. From the divider, the signal is sent through an A/D converter to a desk top computer for processing. The desk top computer digitizes interferometric intensity while the disk changes from a high speed to a low speed.

During the change of disk speed, Ohkubo et al. show flying height to decrease by more than $\lambda/2$. Since the flying height changes, the interferometric intensity varies enough to detect at least one maximum and one minimum fringe intensity. These maximum and minimum fringe intensities are recorded for reference. With the reference maxima and minima of fringe intensity, multi-beam interferometric theory is applied to determine spacing from intensity. However, since for a monochromatic interferometer intensity is a periodic function of spacing, the "fringe order" must be known to finally determine the spacing. This "fringe order" is precisely defined as the interval of spacing from $n/4\lambda$ to $(n-1)/4\lambda$ for n=1, 2, 3. Given an interferometric intensity, and a maximum and minimum fringe intensity for reference, the fringe order n must be determined in order to calculate spacing from the interferometric theory. According to Ohkubo et al.'s paper, the fringe order is determined by landing the slider on the disk by reducing disk speed while monitoring interferometric intensity. The fringe order can be determined by counting the number of times that the interferometric intensity rises to the maximum or falls to the minimum while the spacing is being reduced from the measurement point to the minimum spacing which is assumed to be the fringe order where n=1.

The Ohkubo et al. system has the following disadvantages: 1) the slider must have a design such that the flying height will increase to above λ/2 simply by changing disk speed; 2) the slider must be landed on the glass disk to determine the fringe order for the spacing calculation; and 3) at the points where the fringe intensity is a minima or maxima, the slope of the interferometric intensity/spacing curve becomes zero. At these points, the noise in electronic intensity measurement causes a large error in spacing measurement relative to the other spacings which are not directly on the fringe maximum or minimum.

The above-identified disadvantages may cause the following problems: 1) new sliders with a new geometries designed for very low flying height may not fly as high as λ/2, even at very fast disk speeds, so the Ohkubo et al. technique will not work for such; 2) landing the slider on the disk (required to determine the fringe order) may cause some damage to the air bearing surface of the slider. The possibility for damage to the air bearing surface during test is highly undesirable since many manufacturers test every slider assembly to insure proper flying height; and 3) the relatively high error in spacing measurement at fringe maxima and minima is hidden by "intensity correction" and data "smoothing". These procedures can introduce additional errors into the spacing which is finally calculated.

As magnetic recording technology continues to improve, slider flying heights should continue to decrease to below 100 nm. Also, some manufacturers are beginning to use fluid in the gap to permit smaller spacings. These, too, must be measured. The invention disclosed in this patent is intended to measure such flying heights, statically and dynamically, without having to land the slider on the disk, or have the spacing increase above λ/2 by only changing disk speed.

The method of intensity calibration and fringe order determination disclosed in this patent can also be applied to other measurements where spacing is decreased to the point of contact, in particular, a micro-hardness tester using a transparent probe could be implemented with interferometric measurement of spacing between the surface and the probe using this method of interferometric intensity calibration.

SUMMARY OF THE INVENTION

It is an advantage of the present invention to provide a device for measuring static or dynamic spacing between a transparent article and a reflective surface spacing where the spacing is air or a fluid (down to contact).

Another advantage is to provide a system for measuring flying height which does not require landing of the slider on the disk to determine fringe order.

It is a further advantage of the present invention to provide a flying height tester which uses a calibration procedure to determine maximum and minimum intensity of interference fringes yet is insensitive to changes in illumination intensity or surface reflectivity.

It is still another advantage of the present invention to provide a device capable of measurement of disk surface roughness for an entire disk.

In an exemplary embodiment, the dynamic flying height tester uses a mercury arc lamp light source to provide three distinct wavelengths of light so that three separate interference fringes are generated. Light from the mercury arc lamp is directed substantially normal to the surface of a transparent disk, through the disk and onto the slider on which a magnetic head is mounted. The light reflected from the slider and from the surface of the disk closest to the slider is combined and spectrally analyzed for constructive and destructive interferences at each of the three wavelengths. The spectral analysis is accomplished by a detector assembly which includes wavelength discriminating beamsplitters, a filter for each individual wavelength to be measured and a high speed photodetector for each wavelength. The microscope is also connected to a video monitor for visual monitoring of the fringe pattern.

A calibration procedure involves measurement of the intensity of all colors while partially unloading the head to determine the maximum and minimum intensity of the fringes for each color being used and to identify the correct fringe orders of the interference patterns. The partial unload for calibration is implemented by rotary head unload which is used to move the head away from the detection assembly by a very small distance, on the order of 0.25 μm. In addition to the demonstrated rotary unload mechanism, any mechanical device which causes the spacing between the head and disk to vary by a quarter wavelength or more can be used to cause the spacing change required for calibration.

Since some parameters such as disk speed or head/disk relative position may be changed after the calibration but prior to the desired measurement, a "follow" trace is made to determine the fringe orders of the measurement trace. The follow trace consists of a spacing measurement which is made during the time any changes occur between the calibration trace and the measurement trace. The follow trace is often required to track the fringe order when changes are made to the head/disk system in between the calibration procedure and the measurement.

Once the calibration trace and follow trace are analyzed, the absolute interferometric intensity reference is known, and the fringe orders for the measurement are known. Therefore, measurement of flying height is accomplished by comparing measured intensity with the theoretical intensity versus spacing relationship. The measurement of spacing can be displayed as spacing versus angular position of the disk or spacing versus time. Also, parameters such as average spacing, maximum spacing, minimum spacing and others can be calculated from the dynamic spacing data and logged for future reference.

An alternative light source can be a plurality of lasers where each laser emits a different wavelength light, the wavelengths preferably being relatively short to enable measurement of small spacings.

In a first embodiment, the invention comprises an apparatus for determining the spacing between a transparent article and a reflective surface, wherein the apparatus comprises: a light source for emitting light at a plurality of wavelengths λ; a microscope assembly for focusing at least a first portion of the light along a light path onto a target position between the transparent article and the reflective surface and for receiving reflected light from the target position, the reflected light being a combination of light reflected from an interface between the transparent article and the spacing and light reflected from an interface between the spacing and the reflective surface; a support for maintaining the transparent article at substantially a fixed elevation with respect to the target position; a movable mounting arm for retaining the reflective surface and for moving the reflective surface away from the target position substantially along the light path by at least λ/4; a detector assembly comprising: a plurality of photodetectors for converting fringe patterns created by combination of the reflected light into one electrical signal for each photodetector, one photodetector corresponding to each of the plurality of wavelengths; at least one beamsplitter for distributing each of the plurality of wavelengths to its corresponding photodetector; a plurality of filters disposed between the at least one beamsplitter and the plurality of photodetectors, each filter selectively transmitting one of the plurality of wavelengths to its corresponding photodetector; and a processor for receiving each electrical signal and generating information therefrom to determine the spacing between the transparent article and the reflective surface. Additionally, the processor may be calibrated for each of the plurality of wavelengths by pivoting the mounting arm to move the reflective surface out of the target position to increase the spacing. Furthermore, the support may comprise a rotatable spindle. The mounting arm may also include a thin flexible band under tension for retaining the head assembly. For example, the thin flexible band may be a thin polyester film.

In a second embodiment, the invention comprises an apparatus for determining the spacing between a head assembly and a hard disk, at least one of the head assembly and the hard disk having a transparent portion, the apparatus comprising: a light source for emitting light at a plurality of wavelengths λ; a microscope assembly for focusing a first portion of the light along a light path onto a target position and for receiving reflected light from the target position and directing the reflected light along a common path with a second portion of the light; a support for maintaining the hard disk apart from the head assembly at an elevation such that at least one of an upper surface and a lower surface of the hard disk is disposed substantially at the target position; a pivotable mounting arm for releasably retaining the head assembly and for moving the head assembly into and out of the target position substantially along the light path by at least λ/4; a detector assembly comprising: a plurality of photodetectors for converting fringe patterns created by combination of the reflected light and the second portion of the light into one electrical signal for each photodetector, one photodetector corresponding to each of the plurality of wavelengths; at least one beam splitter for distributing each of the plurality of wavelengths to its corresponding photodetector; a plurality of filters disposed between the at least one beamsplitter and the plurality of photodetectors, each filter selectively transmitting one of the plurality of wavelengths to its corresponding photodetector; and a processor for receiving each the electrical signal and generating information therefrom to determine the spacing between the head assembly and the hard disk. The second embodiment may further include a CCD camera and a video monitor for viewing one of the fringe patterns. The processor may further include an analog to digital converter and a memory for storage of at least one of the electrical signals. In some embodiments, the hard disk is transparent and the first portion of light is reflected from a slider within the head assembly. Alternatively, the head assembly may have a transparent slider and the hard disk may be a magnetic storage disk. In some embodiments, the light source is a mercury arc lamp and in other embodiments the light source is a plurality of lasers.

In a third embodiment, the invention is an apparatus for determining the spacing between a magnetic head assembly and a hard disk, the apparatus comprising: a light source for emitting light at a plurality of wavelengths; a microscope assembly for focusing at least a portion of the light along a light path onto a target position, the reflected light being a combination of light reflected from an upper boundary and a lower boundary of the spacing; a transparent disk having an upper surface and a lower surface, the transparent disk being mounted on a spindle for rotation past the magnetic head, the lower surface being the upper boundary; a pivotal mounting arm for releasably retaining the magnetic head assembly and for moving the magnetic head assembly into and out of the target position substantially along the light path, the magnetic head assembly being the lower boundary; a detector assembly comprising: a plurality of photodetectors for converting fringe patterns created by the reflected light into one electrical signal for each photodetector, one photodetector corresponding to each of the plurality of wavelengths; at least one beam splitter for directing light of each of the plurality of wavelengths to its corresponding photodetector; a plurality of filters disposed between the at least one beamsplitter and the plurality of photodetectors, each filter selectively transmitting one of the plurality of wavelengths to its corresponding photodetector; and a processor for receiving each of the electrical signals and generating information therefrom to determine the spacing between the magnetic head and the hard disk. The processor may be calibrated for each of the plurality of wavelengths by pivoting the mounting arm to move the magnetic head out of the target position to change the spacing. The light source may be a mercury arc lamp.

In a fourth embodiment, the invention may further be embodied as a method for measuring spacing between a transparent article and a reflective surface which comprising the steps of: selecting a light source for emitting light having a plurality of wavelengths; directing the light along a light path toward a target position so that a first portion of the light is reflected by an interface between the spacing and the transparent article and a second portion of the light passes through the transparent article and is reflected by an interface between the spacing and the reflective surface receiving light reflected from the two interfaces so that the combination of the first portion with the second portion generates fringe patterns; optically separating the fringe patterns so that one fringe pattern corresponds to each of the plurality of wavelengths; converting each separated fringe pattern into an electrical signal; digitizing each electrical signal; processing each digitized electrical signal using a processor to determine maximum and minimum light intensity of each of the fringe patterns; and determining the spacing by comparing correlation between light intensity of each fringe pattern and its corresponding wavelength for each wavelength of the plurality. The method may further comprise calibrating the processor by moving the reflective surface away from the target position so that the spacing is increased by at least λ/4 and recording the maximum and minimum light intensity of the fringe patterns for each wavelength when the reflective surface is in motion.

A fifth embodiment of the invention includes a method for calibrating a processor for determining the spacing between a transparent surface and a reflective surface using an interferometer having a light source emitting at a plurality of wavelengths λ which comprises: focusing at least a portion of light from the light source along a light path at the spacing; mounting one of the transparent surface and the reflective surface on a movable mounting so that the spacing can be increased along the light path; receiving reflected light from a first interface between the transparent surface and the spacing and from a second interface between the spacing and the reflective surface; generating a fringe pattern from the reflected light for each of the plurality of wavelengths λ; increasing the spacing by moving the movable mounting; and recording a maximum and minimum light intensity of the fringe pattern while the movable mounting is in motion. This method may further comprise the steps of: generating a look-up table of intensity of each wavelength λ versus spacing; calculating a mean square error for each of a selected increment of the spacing by comparing the recorded maximum and minimum light intensity with a theoretical intensity from the look-up table; and selecting an initial spacing according to the selected increment having the smallest mean square error.

A sixth embodiment includes a method for measuring a spacing between a head assembly and a hard disk which comprises the steps of: replacing one of the head assembly and the hard disk with a transparent substitute; rotating a disk comprising one of the hard disk or a substitute disk on a spindle with a slider comprising one of a substitute head assembly or the head assembly biased toward the disk; directing light having a plurality of wavelengths along a light path through at least a portion of the transparent substitute to be focused at a target position between the slider and the disk; receiving light reflected from a surface of the transparent substitute closest to the target position and from a surface of the slider or the disk according to which has been replaced by the transparent substitute, so that the reflected light from each surface is combined to generate fringe patterns; optically separating the fringe patterns so that one fringe pattern corresponds to each of the plurality of wavelengths; converting each separated fringe pattern into an electrical signal; digitizing each electrical signal; processing each digitized electrical signal using a processor to determine maximum and minimum light intensity of each of the fringe patterns; and determining the spacing by comparing correlation between measured light intensity of each fringe pattern and theoretical light intensity at each wavelength of the plurality. This method may further comprise calibrating the processor by moving the slider away from the target position so that the spacing is increased and recording the maximum and minimum light intensity of the fringe patterns while the slider is in motion. Additionally, the method may further comprise utilizing the intensity measurements recorded during the step of calibrating to determine fringe order. The correct fringe order may be assured by requiring a measurement to be within a fixed range of a previous measurement.

A seventh embodiment of the invention is a method for simultaneously measuring roughness and hardness of a surface which comprises the steps of: splitting light having a plurality of wavelengths λ into a first portion and a second portion; directing the first portion along a light path toward an interface between a transparent probe and the surface at a first location of the surface; attaching a load cell to the probe; reflecting the first portion from the interface; combining the reflected first portion and the second portion to generate fringe patterns; storing maximum and minimum intensity of the fringe patterns for each wavelength λ; calculating spacing using the maximum and minimum intensity; moving the probe toward the surface while continuously generating the fringe patterns and storing their maximum and minimum intensity; and detecting a contact load between the probe and the surface while the probe deforms the surface.

A eighth embodiment is for a method for determining correct fringe order in an interferometric system for measurement of spacing between a transparent article and a reflective surface, the method which comprises: selecting a light source for emitting light at a plurality of wavelengths; detecting interference fringes generated within the interferometric system by reflection from the spacing; separating each of the interference fringes according to its wavelength; generating a theoretical plot of normalized intensity versus spacing for each of the wavelengths; and comparing a measured normalized intensity to the theoretical plot of normalized intensity while altering the spacing.

A ninth embodiment of the invention is an interferometric apparatus for simultaneously measuring roughness and hardness of a first surface comprising: a light source for producing light having a first wavelength and a second wavelength; a measuring probe positioned proximate to the first surface, the measuring probe having a surface adjacent the first surface, the measuring probe surface and the first surface defining a probe-to-surface spacing having a separation distance; optics for directing the first and second wavelengths of light to the probe-to-surface spacing having the separation distance, such that light reflected from the first surface and the measuring probe surface produces a first wavelength interference signal and a second wavelength interference signal, the first and second wavelength interference signals having characteristics determined by the probe-to-surface spacing separation distance; a detector for measuring the intensities of the first and second wavelength interference signals; a calibration controller for changing the probe-to-surface spacing separation distance while acquiring first and second calibration fringe patterns corresponding to the first and second wavelengths; a processor for analyzing the measured intensities of the first and second wavelength interference signals and deriving therefrom the probe-to-surface spacing separation distance; and a load cell attached to the measuring probe wherein the load cell detects a contact load between the measuring probe and the first surface when the measuring probe contacts and deforms the first surface. The processor may further comprise: a look-up-table which contains a first set of theoretical interference signal intensity data which corresponds to the first wavelength of light and a second set of theoretical interference signal intensity data which corresponds to the second wavelength of light; and a comparator for comparing the measured intensities with the look-up-table theoretical intensities to determine the spacing.

A tenth embodiment of the invention is a method for simultaneously measuring roughness and hardness of a surface comprising the steps of: positioning a probe adjacent to a surface to be measured such that the probe and the surface define a separation distance between the probe and the surface; measuring the separation distance between the probe and the surface interferometrically; moving the probe toward the surface until the probe contacts and deforms the surface; and detecting a contact load between the probe and the surface while the probe deforms the surface.

An eleventh embodiment is for an apparatus for positioning a slider relative to a rotating disk comprising: a disk having a rotation axis; a drive mechanism for rotating the disk about the disk rotation axis, thereby defining a first plane in which the disk rotates; a slider positioned proximate the disk; a movable support for retaining the slider in the proximate position relative to the disk thereby defining a separation distance between a surface of the disk and a surface of the slider; and a load controller for moving the movable support along a path which causes the slider to move along a curved path thereby changing the separation distance.

A twelfth embodiment is a method for changing the distance between a rotating disk and a slider comprising the steps of: mounting the slider on a movable mounting; and moving the mounting in a manner which moves the slider along a curved path wherein at least two positions along the curved path correspond to two different separation distances between the disk and the slider.

A thirteenth embodiment is a method of determining the maximum and minimum interferometric intensities for a first interference calibration signal at a first wavelength and a second interference calibration signal at a second wavelength, the first and second interference calibration signals produced by a spacing, the method comprising the steps of:

(a) acquiring multiple measurements of each of the first and second interference calibration signals while altering the spacing such that each of the first and second interference calibration signals goes through a maximum and a minimum of interferometric intensity;

(b) estimating an initial maximum and minimum interferometric intensity for each of the first and second interference calibration signals;

(c) calculating the spacing for each of the multiple measurements using the initial maximum and minimum estimates;

(d) calculating a new maximum for a plurality of the multiple measurements of the interferometric intensity within a threshold value of the initial maximum for each of the first and second interference calibration signals in accordance with the expression:

$$I_{MAX,NEW} = I_{MIN} + \frac{(1 + \overline{I_{MEAS}})}{(1 + \overline{I_{THRY}})} (I_{MAX} - I_{MIN})$$

where $I_{MAX,NEW}$ is the updated value for the maximum interferometric intensity, $I_{MAX}$ and $I_{MIN}$ are the previously existing values for maximum and minimum interferometric intensity, $\overline{I_{MEAS}}$ is the intensity measured at that calibration point, normalized to $-1$ and $+1$ which correspond to $I_{MIN}$ and $I_{MAX}$, and $\overline{I_{THRY}}$ is the theoretical intensity for the spacing at that point, normalized to a scale of $-1$ to $+1$;

(e) calculating a new minimum for a plurality of the multiple measurements of the interferometric intensity within a threshold value of the initial minimum for each of the first and second interference calibration signals in accordance with the expression:

$$I_{MIN,NEW} = I_{MAX} - \frac{(1 - \overline{I_{MEAS}})}{(1 - \overline{I_{THRY}})} (I_{MAX} - I_{MIN})$$

where $I_{MIN,NEW}$ is the updated value for the minimum interferometric intensity, $I_{MAX}$ and $I_{MIN}$ are the previously existing values for maximum and minimum interferometric intensity, $\overline{I_{MEAS}}$ is the intensity measured at that calibration point, normalized to $-1$ and $+1$ which correspond to $I_{MIN}$ and $I_{MAX}$, and $\overline{I_{THRY}}$ is the theoretical intensity for the spacing at that point, normalized to a scale of $-1$ to $+1$;

(f) averaging the new minima for the plurality of the multiple measurements of the interferometric intensity within a threshold value of the initial minimum and the new maxima for the plurality of the multiple measurements of the interferometric intensity within a threshold value of the initial maximum to determine a new average maximum and a new average minimum intensity; and (g) comparing the new average maximum and new average minimum with the initial maximum and initial minimum for each of the first and second interference calibration signals.

This method may further comprise the step of: (h) checking for convergence of the new average maximum and the new average minimum with the initial maximum and the initial minimum for each of the first and second interference calibration signals. Additionally, the method may comprise the step of: (i) repeating steps (c) through (h) if the test for convergence in step (h) is negative using the new average maximum and the new average minimum in place of the initial maximum and the initial minimum. Also, the method may comprise the step of determining the initial maximum and the initial minimum intensities by searching the multiple measurements acquired in step (a) for the highest and lowest measurement points for each of the first and second wavelengths and using these values as the initial estimates for the maximum and minimum interferometric intensities for each of the first and second wavelengths, respectively.

A fourteenth embodiment is for an interferometric method for measuring the dimension of a small spacing comprising: directing light having a plurality of wavelengths across the small spacing; detecting interference signals generated by reflection of the light from the spacing; separating each of the interference signals according to its wavelength; measuring and recording the interference signal intensity at two or more of the plurality of wavelengths for a range of spacing by altering the spacing over a range which produces a maximum and a minimum in intensity for each of the plurality of wavelengths; measuring and recording the interference signal intensity produced by the spacing for each of the plurality of wavelengths; constructing a table having multiple periodic spacing dimensions for each of the plurality of wavelengths, wherein each of the multiple periodic spacing dimensions corresponds to the measured and recorded interference signal intensity for each of the plurality of wavelengths, respectively; and comparing the multiple periodic spacing dimensions for one of the plurality of wavelengths with the multiple periodic spacing dimensions for the remaining of the plurality of wavelengths to determine the correct spacing dimension.

A fifteenth embodiment is for an interferometric apparatus for measuring the dimensions of a small spacing, the apparatus comprising: a light source for producing light having a first wavelength and a second wavelength; optics for directing the first and second wavelengths of light to a spacing having a separation distance, the spacing defined by first and second boundaries, such that light reflected from the first and second boundaries produces a first wavelength interference signal and a second wavelength interference signal, the first and second wavelength interference signals having characteristics determined by the separation distance; a detector for measuring the intensities of the first and second wavelength interference signals; a calibration controller for changing the separation distance while acquiring first and second calibration fringe patterns corresponding to the first and second wavelengths; and a processor for analyzing the measured intensities of the first and second wavelength interference signals corresponding to the separation distance and deriving therefrom the separation distance, the processor further comprising: a table having multiple periodic spacing dimensions for each of the measured intensities of the first and second wavelength interference signals, wherein each of the multiple periodic spacing dimensions for the first wavelength corresponds to the measured intensity of the first wavelength interference signal and each of the multiple periodic spacing dimensions for the second wavelength corresponds to the measured intensity of the second wavelength interference signal; and a comparator which compares the table entries for the multiple periodic spacing dimensions for the first wavelength with the table entries for multiple periodic spacing dimensions for the second wavelength to determine the correct spacing dimension.

BRIEF DESCRIPTION OF THE DRAWINGS

Understanding of the present invention will be facilitated by consideration of the following detailed description of a preferred embodiment of the present invention, taken in conjunction with the accompanying drawings, in which like reference numerals refer to like parts and in which.

DETAILED DESCRIPTION OF THE PREFERRED EMBODIMENTS

Figure 1:
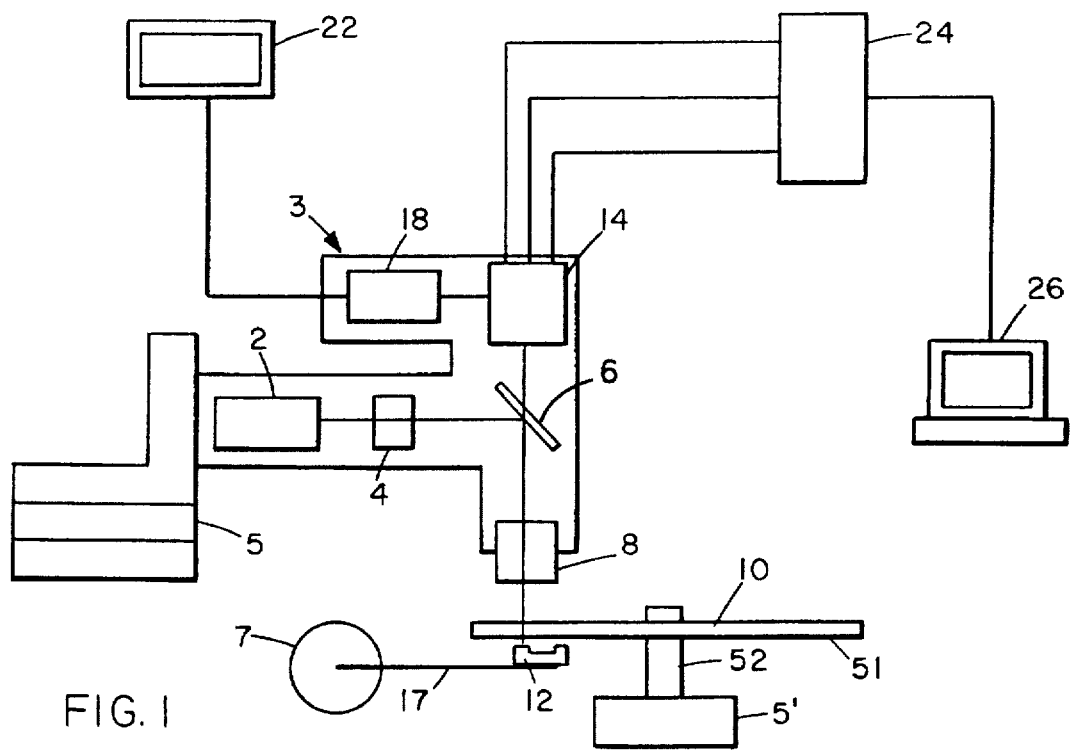
FIG. 1 is a diagrammatic view of the flying height testing assembly of the present invention.

As illustrated in FIG. 1, light source 2 is directed through microscope 3 which comprises condensing optics 4, beamsplitter 6 and objective 8. A portion of the incident light split by beamsplitter 6 is directed through glass disk 10 and is internally reflected off the lower surface of the glass disk 10. Another portion of the light is reflected by slider 12. The reflected light is redirected through the objective lens and the beamsplitter 6 into detector assembly 14. The recombination of the light reflected by the lower surface of the disk 10 and the surface of slider 12 results in the generation of interference fringes, with one interference fringe being generated for each individual wavelength of light which has been selected by filters within the assembly. A camera 18 sends a visual image of the fringe patterns to video monitor 22. The photodetectors within the detector assembly 14 convert the fringes' intensity into electrical signals which are then converted to digital data by A/D converter 24. The digital data are then processed at processor 26.

Disk 10 is mounted on spindle 52 which is attached to a variable speed drive capable of achieving speeds in excess of 7200 rpm. In the first embodiment illustrated in FIG. 1, the disk 10 is transparent glass or quartz. The slider 12 is attached to rotary load/unload arm 17, which is further illustrated in FIG. 8a, by clamping suspension 13, illustrated in FIG. 7, onto the end of arm 17 at a given location. Rotary load/unload arm 17 is driven by rotary motor 7. Slider 12 is then positioned under the disk 10 so that light focused by objective 8 passes through disk 10 to be reflected from slider 12 and from the bottom edge 51 of disk 10.

Figure 6:
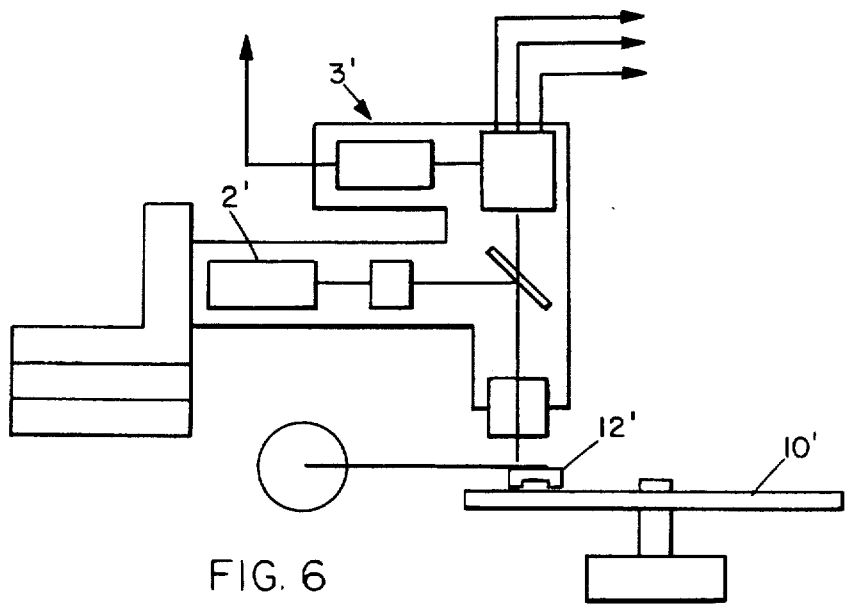
FIG. 6 is an alternate configuration of the testing assembly for measurement of disk surface roughness.

In an alternate embodiment shown in FIG. 6, the light source 2' and microscope assembly 3' are positioned relative to the arm and drive so that the slider 12' is between the microscope assembly 3' and disk 10'. Slider 12' is transparent, permitting glide height measurement of an actual magnetic disk 10'. Such a configuration provides measurement of disk surface roughness to identify disk asperities for mapping of asperity heights.

Rotary load/unload arm 17 pivots in such a manner that the slider 12 moves along a line following the light path exiting from objective 8 for at least part of the unload motion. This allows the light to be focused on the same spot on the slider 17 during the calibration procedure, which is described below. The purpose of this movement is to scan at least one fringe maximum and minimum for each color used by increasing the head/disk spacing. Only a small spacing change required, on the order of 0.25 μm, to measure a maximum and minimum intensity for each color fringe to enable calibration. The remainder of the load/unload motion is not critical to measurement functions.

Figure 2:
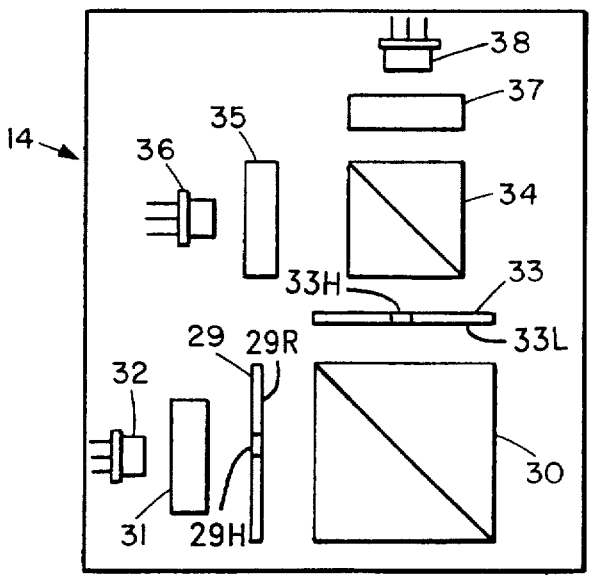
FIG. 2 is a diagrammatic view of the detector assembly.

FIG. 2 illustrates the elements of detector assembly 14. A first beamsplitter cube 30 reflects light at 436 nm toward absorptive pinhole mirror 29 and 436 nm interference filter 31 to photodetector 32. Beamsplitter cube 30 is a dichroic beamsplitter made from BK7. The entrance face has an anti-reflection coating. The interface is coated for 85–95% reflectance at 435.8 nm and 85–95% transmittance at 546 nm and 580 nm. The portion of light which passes through beamsplitter cube 30 passes through reflective pinhole mirror 33 to beamsplitter cube 34 which reflects light at 546 nm toward 546 nm interference filter 35 and detector 36. Beamsplitter 34 is also dichroic and made from BK7. Its interface coating is 90–100% reflective at 546 nm and 90–100% transmissive at 580 nm. Each of the interference filters are commercially available filters which transmit light at the chosen wavelength with a bandwidth of 10 nm. The photodetectors are silicon avalanche photodiodes with spectral response in the range of 400–1000 nm. The remaining light continues forward through 580 nm interference filter 37 to photodetector 38. A separate signal is therefore generated for each selected wavelength, and each analog signal generated by photodetectors 32, 36 and 38 is converted to a digital signal by high speed A/D converter 24.

The timing signal by which the sampling rate is controlled is 250 kHz. The timing rate is applied to the A/D converter as a conversion rate control signal. This rapid rate of data conversion enables dynamic measurement of spacing between the head and disk.

Figure 3:
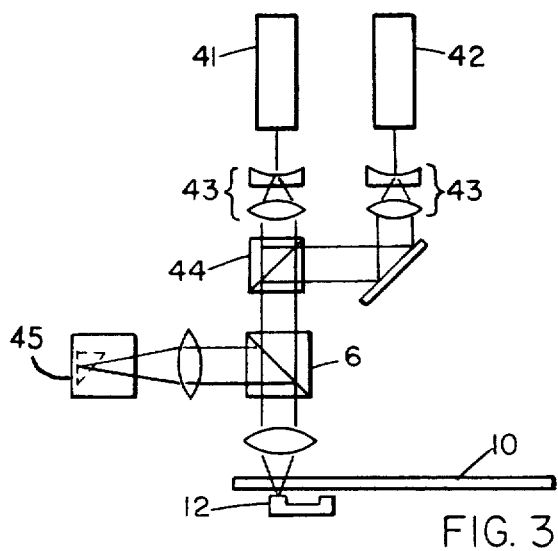
FIG. 3 is a diagrammatic view of the assembly with an alternate light source.

In an alternate embodiment, light beams emitted from two or more lasers can be optically combined to generate the illumination projected onto the head/disk interface. Such a configuration is illustrated in FIG. 3 in which lasers 41 and 42 each emit at different wavelengths. The beams are expanded by beam expander optics 43 and are combined at beamsplitter 44 to be projected though the microscope objective as above. The detector assembly 45 will have the same number of detectors as lasers, and the appropriate interference filters for the selected lasing wavelengths will be provided.

Figure 7A:
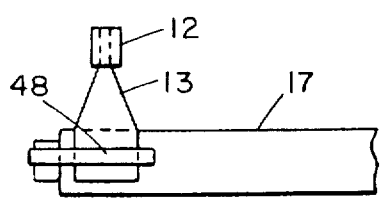
FIGS. 7a–b is a diagrammatic view of the apparatus for attaching the head assembly to the load/unload arm.
Figure 7B:
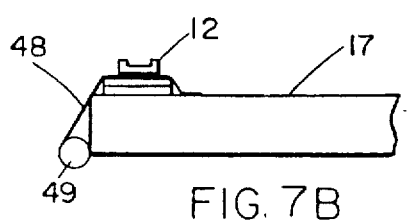

The accuracy and repeatability of the location of the head 12 with respect to the disk 10 requires that appropriate attachment means are provided to hold the head 12 into place. The suspension 13 must be attached to and removed quickly from the mounting arm 17, and the attachment must be uniform and repeatable. In order to quickly and repeatable grip the suspension 13, the use of a flexible band 48 of polyester film, such as Mylar®, or Kapton®, is used as shown in FIG. 7, with a tension means 49 included to keep the band 48 taut. Since the suspension 13 is somewhat flexible, it may be deformed under uneven or excessive pressure as might be applied by a steel clamp. The flexible band 48 does not deform the suspension 13 and is very thin, as required by the small spacing between the suspension 13 and the disk 10.

Figure 8A:
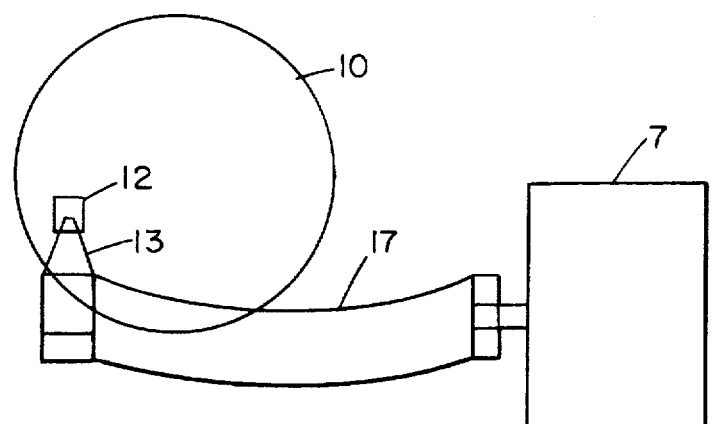
FIG. 8a is a diagrammatic top view of the rotary unload mechanism.
Figure 8B:
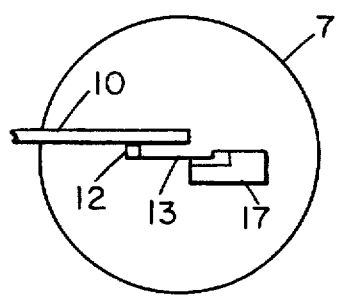
FIGS. 8b and 8c illustrate the load and unload positions, respectively.
Figure 8C:
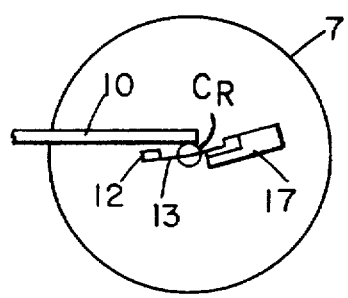

The procedure for measuring the spacing between the head 12 and the disk 10 is as follows:

The head 12 is attached to the suspension using the flexible band 48, and the rotary load/unload arm 17 moves the head 12 into the desired location, as in FIG. 8b. Light from the light source 2 is projected through the microscope 3 onto the head 12, and the head 12 is then partially unloaded by rotation of arm 17, as illustrated in FIG. 8c, so that a calibration trace can be generated. The head unload motion is synchronized with the digitization by the processor 26 such that the digitization will record the intensity of one maximum and one minimum fringe for each individual wavelength tested. The rotary head unload is used so that the slider 12 has only very slight motion while the loading pressure is reduced. The slight motion of the slider 12 is compensated for by moving the microscope assembly 3 by way of x-y translators 5 and 5' in synchronization with the unload motion so that the measurement spot remains at the same point on the slider 12. As previously described, the unload motion required for calibration increases the spacing by a very small amount, on the order of 0.5 µm.

The calibration trace is digitally lowpass filtered to reduce electronic noise. A maximum and minimum intensity for each color in the calibration trace is found by searching through the data collected. The trace is normalized to the maximum and minimum intensity for each color by multiplying a constant and adding a constant offset. In the preferred embodiment, the maximum intensity for each color is scaled to 1.0 and the minimum intensity for each color is scaled to −1.0.

A look-up table for intensity of each color versus spacing is generated for discrete steps of spacing based on Equation 1 which was derived from multiple beam interferometric theory for a single film.

$$\frac{I_{Out}}{I_{In}} = \frac{r^2 + s^2 + 2rs\cos\delta}{1 + r^2s^2 + 2rs\cos\delta} \quad (1)$$

where:
r=Amplitude Reflection Off Glass Disk;
s=Amplitude Reflectance Off Slider;
n=Refractive Index of the Fluid in the Spacing;
$\delta = 4\pi n\, H/\lambda - \gamma$;
H=Flying Height;
λ=Wavelength of the Illuminating Light; and
γ=Phase Shift on Reflection (Material Dependent)

The values of r, s, and γ are determined by ellipsometric measurement of the surfaces using light of the same wavelengths as those being used for the interference measurement of spacing.

The ellipsometer measures angles ψ and Δ from which the complex index of refraction $\bar{n}=n-ik$ can be determined. The reflectance for the disk and slider can then be determined from Equation 2:

$$r = \sqrt{\frac{(n_0 - n_1)^2 + k_1^2}{(n_0 + n_1)^2 + k_1^2}} \quad (2)$$

where $\bar{n}_o$ is the refractive index of the medium immediately above the reflecting surface which has the refractive index $\bar{n}_1$.

For the internal glass reflection $\bar{n}_0$ is the index of glass and $\bar{n}_1$ is the index of the fluid in the spacing. For the reflection off the slider, $\bar{n}_o$ is the index of the fluid in the spacing (air or liquid) and $\bar{n}_1$ is the index of the slider.

From the ellipsometric measurements, the phase change upon reflection γ can be calculated using Equation 3:

$$\gamma = \tan^{-1} \frac{2n_0 k_1}{n_0^2 - n_1^2 - k_1^2} \quad (3)$$

For use in Equation 1, $\gamma = \gamma_{slider} - \gamma_{glass\ disk}$.

In the present embodiment, a look-up table is generated using Equations 1, 2 and 3 with intensities for spacings for 0 to 1,000 nm with steps of 1 nm. The theoretic intensity look-up table is normalized to fringe intensity extrema using the same convention as that used for the measured traces, i.e., +1 is maximum, −1 is minimum.

Table 1 illustrates the form of the look-up table for intensity versus spacing:

TABLE 1

| | INTENSITY | | |
|---|---|---|---|
| SPACING | $\lambda_1$ | $\lambda_2$ | $\lambda_3$ |
| 0 | −1 | −1 | −1 |
| 5 | −0.8 | −0.7 | −0.6 |
| 10 | −0.6 | −0.4 | −0.2 |

Once the measurements are made and the look-up table is generated, a calculation is made to determine the spacing for the first point in the calibration curve. The calculation of spacing is made as follows:

A "mean square error" is calculated for each discrete step of spacing (H) in the range of interest. Here, steps of spacing from 0 to 1,000 nm in steps of 1 nm are used. These steps conveniently correspond to the values in the theoretical look-up table above. The mean square error (e) is calculated as follows:

$$e(h) = w_1(T_1 - M_1)^2 + w_2(T_2 - M_2)^2 + w_3(T_3 - M_3)^2 \quad (4)$$

where $T_x$ is the theoretical intensity of color x for the spacing H (from the look-up table) and $M_x$ is the measured intensity of color x.

The symbols $w_x$ are used to indicate weighing functions which help reduce error. While all of the w's can be set to one, accuracy can be improved by choosing the w's such that $w_1+w_2+w_3$=some constant and setting each w higher for a color when the signal-to-noise ratio of that color's intensity measurement is higher. Additionally, $w_x$ may be a function of spacing because, near the maximum or minimum of a given color's intensity, a small amount of electrical noise corresponds to a relatively large change in spacing.

For reference purposes, the "first point" of a trace requires intensity measurements for all three colors, $\lambda_1$, $\lambda_2$ and $\lambda_3$. The measured intensity of all colors are stored together and they, as a group, will be referred to as a single point in the intensity trace.

Once (e) has been calculated for each step of spacing, the smallest value of (e) corresponds to a first guess for the initial spacing for the first point in the calibration array. Occasionally, noise in the intensity signal may result in the calculated value being the wrong fringe order. For example, considering only one color, if the normalized intensity is −1, the spacing is given by $n\lambda/2$ where $\lambda$ is the wavelength of light and n is the fringe order (n=0, 1, 2, 3, 4...). This result comes from a simple model which assumes the disk and slider are made of dielectric materials.

Figure 10:
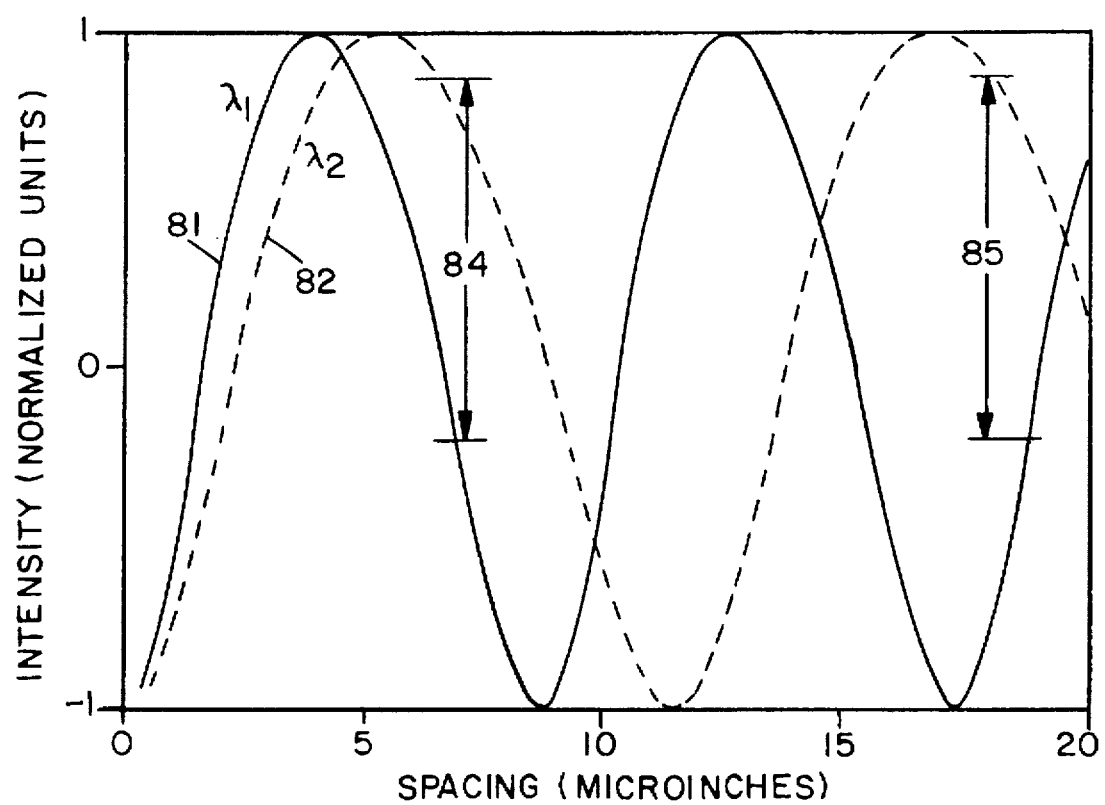
FIG. 10 is a plot of intensity versus spacing.

The use of two or more colors gives additional information which theoretically indicates the correct fringe order. However, the addition of some noise to the measured signals will occasionally cause this technique to calculate an initial spacing which is significantly incorrect because it is on the wrong fringe order. The principle by which fringe order is determined can be explained by looking at a plot of intensity versus spacing for interference fringes generated for two or more colors. FIG. 10 illustrates such a plot for two colors. The intensity function 81 for $\lambda_1$ has a different period than that for $\lambda_2$ (82). By comparing the normalized measured intensity with the normalized theoretical intensity for both colors the spacing can be determined but there may be some uncertainty as to fringe order. For example, the normalized intensity difference between $\lambda_1$ and $\lambda_2$ at points 84 and 85 is the same at different orders. This is solved by measuring the intensity continuously while the spacing between the transparent article and the reflective surface is changed (increased) which shows the slope of the respective functions beyond the initial point 84. This enables identification of the correct order.

To determine the correct fringe order, the entire calibration intensity trace is used as follows:

Several different first guesses are made for the spacing for the first point in the calibration trace. The criteria for selection of the first point initial guesses for spacing are that each spacing must have a low value of (e). Additionally, each guess must be at least 100 nm away from all the previously-selected initial guesses for spacing. Once several of the initial guesses are obtained, one of the guesses in correct, but the correct one must be determined.

In order to determine which first guess is correct, a cumulative mean square error for each initial guess in calculated. The cumulative error is calculated by assuming that the spacing does not change by more the 100 nm between each point. The following process is used to calculate the cumulative mean square error for each initial guess of spacing.

First, the cumulative error is set to the (e) which corresponds to the initial guess for the spacing at the first point in the calibration trace. Next, the spacing at the second point is calculated by searching though all spacing values within ±100 nm from the first point. The (e) determined for the second point is added to the cumulative error. The second step is repeated for all remaining points in the calibration trace with the condition that each point must not be more than 100 nm away from the previous point. Once the cumulative error is calculated for each initial guess for spacing of the first point in the calibration, the spacing with the lowest cumulative error is determined to be the spacing for the first point in the calibration.

Analysis of the data taken during calibration has yielded the maximum and minimum intensity for each fringe and the fringe order for the spacing measured during the calibration step.

Since operational parameters may change after the calibration but before the measurement, the fringe order may change, hence a "follow" trace is recorded while any operation parameters are changed. It is assumed that the first point in the follow trace is within 100 nm of the first point of the calibration trace.

The spacing for each point in the follow trace is calculated as follows:

Point-by-point, the mean square error is determined for spacings with values from −100 to +100 nm away from the previous point. Note that, since the first point in the follow trace does not have a previous point, the spacing is calculated from the first point in the calibration trace. The spacing with the lowest (e) is determined to be the spacing, and the process is repeated for all points in the trace. By limiting the calculation such that each successive point must be within 100 nm of the previous point, the calculation can never jump to an incorrect fringe order.

Once the spacing for the follow trace is calculated, it can be assumed that the spacing for the first point in the measurement trace is within 100 nm of the last point of the follow trace. Since the approximate spacing for the first point of the measurement trace in known, the spacing for the measurement trace is performed using the same procedure used to calculate the spacing for the follow trace.

It should be noted that the 100 nm difference limit is arbitrarily selected and that other values may be used as allowed by the wavelengths of light used for measurement, i.e., the limit should not exceed ¼ wavelength.

Figure 4A:
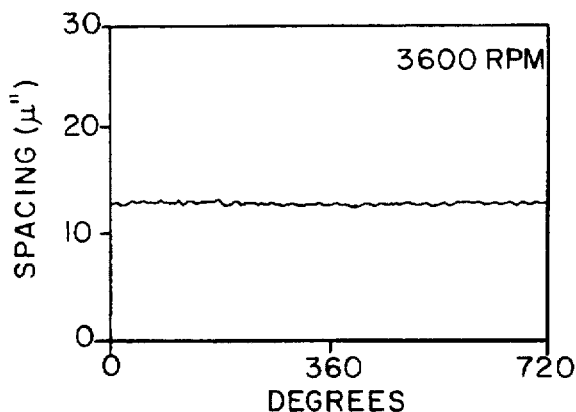
FIG. 4a–d is a series of plots of spacing versus angle of rotation.
Figure 4B:
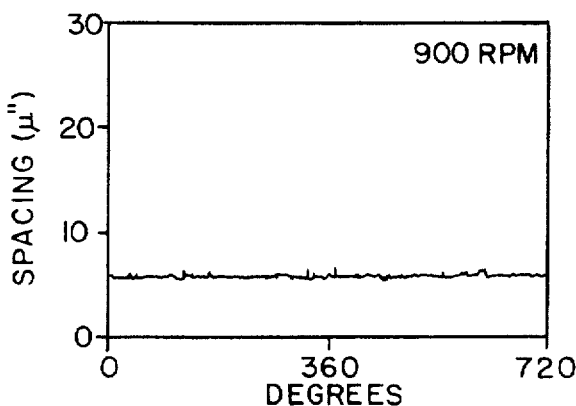
Figure 4C:
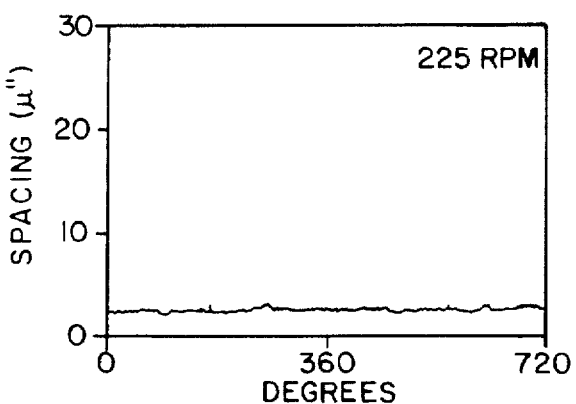
Figure 4D:
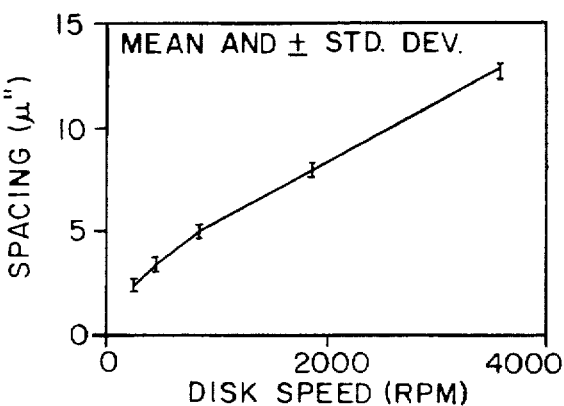

In the preferred embodiment, the flying height tester measures at least 256 points per revolution. A typical test involves storage of data of intensity versus angle for two revolutions. Thus, at least 512 points are taken for each data set. The processor converts intensity versus revolution data into spacing versus revolution and provides an output display in either the form of a video monitor or a printout. Since air bearing thickness is a function of disk speed, testing of the spacing between a given head and disk is preferably performed at a number of disk rotational speeds. FIG. 4 illustrates a series of plots of spacing versus angle for two revolutions. FIGS. 4a, b and c show plots at 3,600 RPM, 900 RPM and 225 RPM, respectively. FIG. 4d is a plot of spacing versus disk speed illustrating the principle of increased spacing with increased rotational speed.

Figure 5:
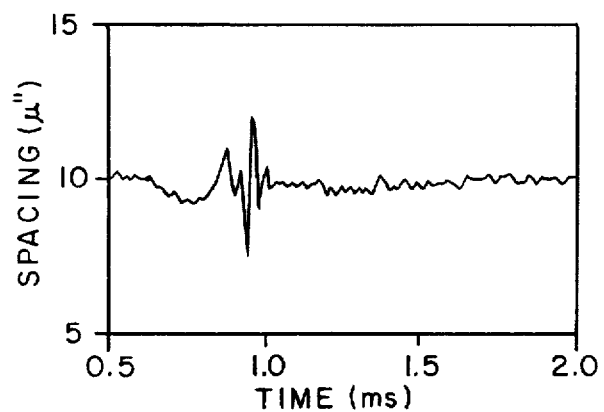
FIG. 5 is a plot of spacing versus time.

FIG. 5 is a plot of spacing versus time to show measurement by the system of dynamic variation of head/disk spacing after the head flies over a flaw in the disk.

Interferometric fringe intensity calibration is used to calibrate maximum and minimum intensity of light and dark interferometric fringes. The maximum and minimum fringe intensity is measured at one or more points on the interferometric image while altering interferometric path length by at least ¼ of the wavelength of the light being used to produce the interferometric image. By comparison of interferometric intensity to the maximum and minimum intensity, it is possible to obtain spatial measurement with a resolution of a small fraction of the wavelength of light used.

Figure 9:
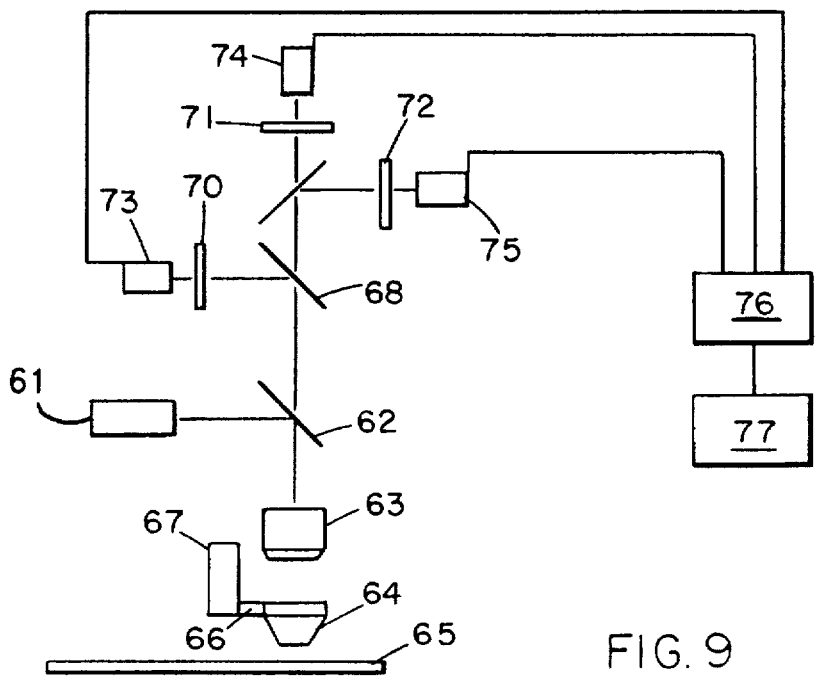
FIG. 9 is a diagrammatic view of an alternate embodiment in the form of an interferometric surface roughness/surface hardness measurement instrument.

While a number of flying height testers use interference to measure the spacing between the head and media, the system of the present invention utilizes a unique calibration technique in which the head is unloaded in a controlled manner to increase the relative path lengths of the two light rays while monitoring and storing the intensity information in order to utilize interferometric fringe intensity for calibration of the measurement. Thus the need for expensive and difficult control of system components such as light sources, detector drift and disk quality is eliminated. The apparatus of the present invention provides high speed measurement of head/disk spacing simultaneously using multiple wavelengths of light, thus offering a more economical and faster measurement system and technique for dynamic measurement of flying Shown in FIG. 9 is another use of the intensity calibration method, here used for a micro-hardness tester/surface profiler. In FIG. 9, light from source 61 which could be a Mercury arc, a multiple laser, or other multi-wavelength source, goes though beamsplitter 62, then through microscope objective 63, being focused on the interface between transparent probe 64 and the surface to be analyzed 65. The probe is lowered onto the surface using computer-controlled actuator 67 which could use piezo-electric or other means of mechanically moving the probe 64 toward the surface 65. The contact load between the probe 64 and the surface 65 is detected by a load cell 66. Light reflected from the surface of the probe 64 which is closest to the sample surface and the surface itself 65 recombines, producing interference effects. Monochromatic images of the interference fringes are projected onto TV cameras 73, and 75 after going through beamsplitters 62, 68 and 69, as well as narrow band interference filters 70, 71, and 72. Each TV camera then produces an analog video signal corresponding to the interferometric image for the narrow band of light associated with each interference filter. Note that filters 70, 71, and 72 each transmit a different color of light. The analog video signals are directed into the RGB color frame grabber 76 which is under control of the personal computer 77.

To make a surface roughness and hardness measurement, the computer controlled actuator 67 lowers the probe 64 onto the surface 65. During the time that the probe is coming into contact with the surface, the frame grabber 76 continuously acquires images of the three different interference images and the computer processes such images, storing the maximum and minimum intensity of each color at each pixel on each image. Before the probe 64 comes into contact with the surface 65, a minimum and maximum intensity of the fringes for each color will have been detected for each pixel of each image of the fringes. These maximum and minimum fringe intensity values are the normalization intensity values required to determine spacing between the probe 64 and the surface 65. The spacing between the probe 64 and the surface 65 is calculated in a manner identical to that described for the Dynamic Flying Height Tester, except the spacing is calculated for a 2-dimensional area rather than a single spot, and the spacing is measured statically, not dynamically. Since the probe 64 shape in known beforehand, the surface profile of the surface 65 can be readily calculated from the spacing between the probe 64 and the surface 65. This surface profile indicates the roughness of the surface.

The surface hardness and other surface properties can be measured by pressing the probe 64 onto the surface 65. The force with which the probe is being pressed onto the surface is measured using load cell 66. The surface profile can continue to be measured interferometrically while it is being deformed by the probe. The measurement of surface deformation as a function of contact pressure will allow a measurement of surface hardness while causing a minimum amount of damage to the surface.

SPACING MEASUREMENT APPARATUS WITH REFERENCE DETECTOR

Figure 11:
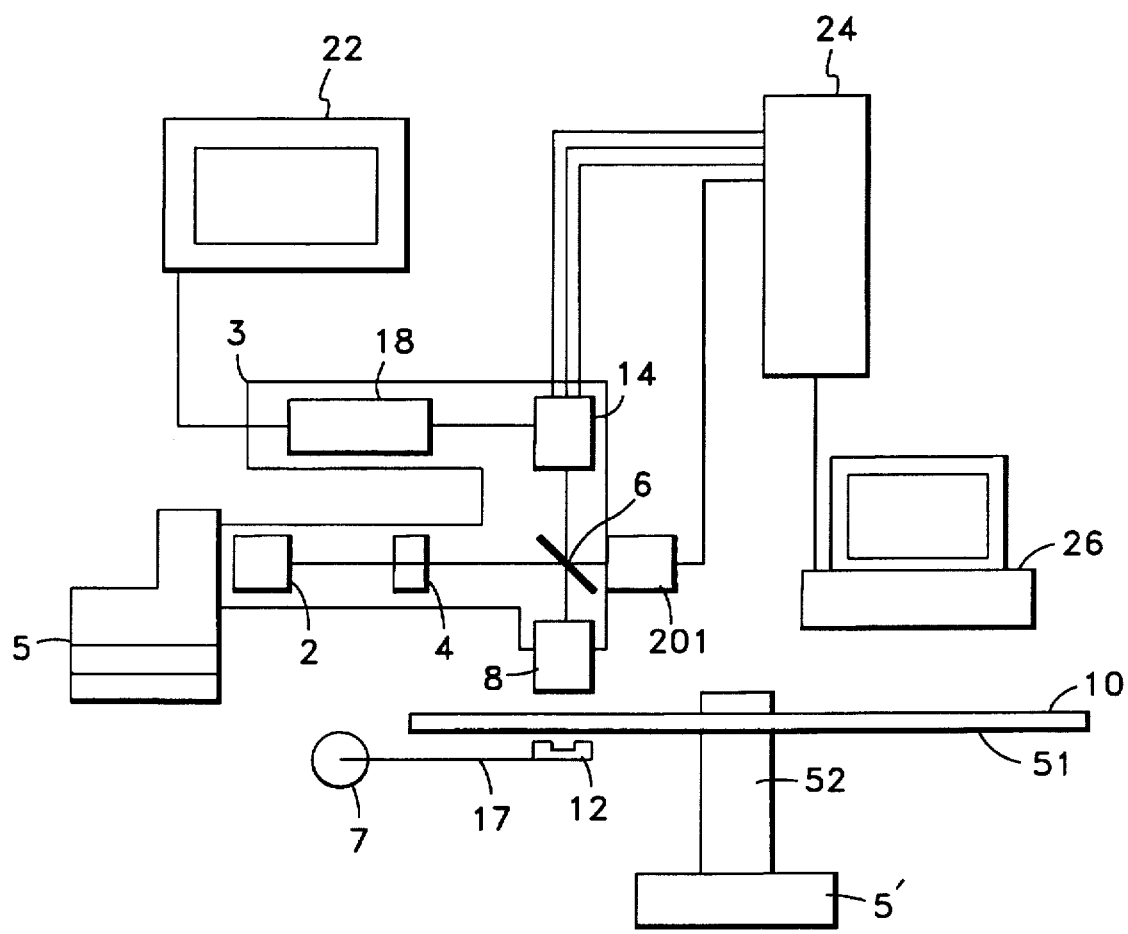
FIG. 11 shows a schematic representation of a dynamic flying height tester including a reference level photo detector.

The spacing measurement apparatus may also be implemented using an additional reference channel to compensate for light source instabilities. Referring to FIG. 11, light from a source 2 is directed through condenser optics 4 toward a half-silvered mirror or beam splitter 6. A portion of the light goes through lens assembly 8 and is projected toward the bottom surface 51 of the glass disk 10. A portion of the light internally reflects from the bottom surface 51 and a portion of the light transmits through the bottom surface 51, then reflects off the top surface of head/slider assembly 12. A portion of the reflected light transmits back into the disk 10 and a portion reflects back toward the head/slider assembly 12. A part of the light continues to reflect back and forth between surface 51 and the surface of 12, with a portion of the light transmitting through surface 51 for each reflection. A portion of the light from each of the multiple reflections from the interface of the disk 10 and the slider 12 is directed back through the lens assembly 8 and the half-silvered mirror 6 to the optical detector assembly 14. Lens assembly 8 is designed to form an optical image of the interface between glass disk 10 and head/slider assembly 12 on the mirror 33 within the detector 14 (see FIG. 2).

As shown in Figure in 2, the beamsplitter 30 sends a portion of the light toward the absorptive plate 29 and a portion to the mirror 33, with the lower surface 33L of mirror 33 and the right surface 29R of plate 29 both being image planes for the interface of glass disk 10 and head/slider assembly 12 from optical assembly 8. Both the absorptive plate 29 and the mirror 33 have small holes, 29H and 33H, approximately 0.030 inches in diameter near their centers. The plate 29 and the mirror 33 are aligned such that the holes 29H and 33H occur in substantially the same portion of the image which is the point on the interface at which the spacing is measured (the measurement spot). After proceeding through the hole 29H in the plate 29, light is filtered through a narrow-band-pass filter, commonly called an interference filter 31. This filter allows a 10 nm wide band of light to pass through to the avalanche photo diode 32. Simultaneously, light passes though the hole 33H in the mirror 33 toward the second beam splitter 34 which causes a portion of the light to pass through the second interference filter 35 to the second photo diode 36 and a portion of the light passes through the third interference filter 37 to the third photo diode 38.

The three interference filters (31, 35, and 37) are selected to have pass bands centered at three substantially different wavelengths of light. The intensity of each of the three different wavelengths is converted into an electrical signal by photo diodes 32, 36, and 38. The electrical signals are amplified and buffered then sent to the digitizer 24 via three coaxial cables.

Referring again to FIG. 11, a portion of the light from source 2 goes through condenser optics 4 and through the half-silvered mirror 6 to a reference detector 201. Reference detector 201 converts the intensity of the light into an electrical signal which is sent to digitizer 24 via coaxial cable. Within digitizer 24, the reference channel signal can be used in several different ways. Each of the measurement signals from detectors 38, 36, and 32 can be divided by the reference signal using analog electronic circuits in order to compensate for intensity drift of the light source. Alternatively, digital electronic circuits can be used to divide the measurement signals by the reference signal after all four signals are digitized. Another alternative is to digitize all four signals and send them all to the microcomputer/processor 26 where the measurement signals can be adjusted to compensate for light source drift using the reference signal information.

The digitizer 24 is interfaced to microcomputer/processor 26, which is used to process the digitized intensity information.

THEORY OF OPERATION

The amount of light traveling back through the disk 10 including the first and all of the higher order reflections between the lower surface of the disk 51 and the top surface of the slider 12 is given by Equation 1 (reproduced below) which is commonly referred to as the equation describing multi-beam interferometry.

$$\frac{I_{Out}}{I_{In}} = \frac{r^2 + s^2 + 2rs\cos\delta}{1 + r^2s^2 + 2rs\cos\delta} \quad (1)$$

In Equation 1, r is the amplitude of reflection off the lower surface of the glass disk 51, s is the amplitude of the reflected light off the top surface of the head/slider assembly 12 and δ is the phase shift between the two reflected wave fronts given by the as following relationship:

$$\delta = \frac{4\pi n H}{\lambda} - \gamma \quad (5)$$

where H the spacing between the lower surface of the glass disk 51 and the top surface of the head/slider assembly 12, n is the refractive index of the fluid in the spacing (1 for air), λ is the wavelength of the light, and γ is the phase shift on reflection.

The values of r, s, and γ are determined by ellipsometric measurement of the surfaces using light of the same wavelengths as those being used for the interference measurements of spacing. In general, the technique of ellipsometry can be used to determine the phase shift upon reflection off the slider even in cases where the slider is coated with one or more optically thin films.

For the simpler case where the slider is a bulk material, commercially available software can calculate the complex index of refraction (n−ik) of the slider based on the angles Δ and ψ which are measured using an ellipsometer. One such program is entitled "Ellipsometric Data Reduction Software" which is available from Rudolph Research, One Rudolph Rd, Flanders, N.J. 07836.

Once $n_{slider}$, $k_{slider}$, and $n_{fluid}$ are known, s, the amplitude reflection off the slider can be calculated as follows:

$$s = \sqrt{\frac{(n_{fluid} - n_{slider})^2 + k_{slider}^2}{(n_{fluid} + n_{slider})^2 + k_{slider}^2}} \quad (6)$$

based on the assumption that the fluid is a transparent material (i.e., $k_{fluid}=0$).

For the case where the disk and the fluid are both transparent (i.e., $k_{fluid}=k_{disk}=0$), r, the amplitude of internal reflection off the lower surface of the disk is given by:

$$r = \sqrt{\frac{(n_{disk} - n_{fluid})^2}{(n_{disk} + n_{fluid})^2}} \quad (7)$$

The phase shift upon reflection off the slider is given by:

$$\gamma_{slider} = \tan^{-1} \frac{2 n_{fluid} k_{slider}}{n_{fluid}^2 - n_{fluid}^2 - k_{slider}^2} \quad (8)$$

For the case of a transparent fluid and disk, with the index of refraction of the disk higher than the index of refraction of the fluid, the phase shift upon reflection off the lower surface of the disk is zero. However, more general conditions such as a disk with an optically thin film on it will result in a condition where the phase shift on internal refection off the disk will not equal zero. In such cases, the total effect of phase shift on reflection (γ in Equation 1) is given by $\gamma = \gamma_{slider} - \gamma_{disk}$.

Although Equations (1) and (5) through (8) apply to the specific case where the slider is a bulk, absorbing material and the fluid and glass disk are transparent materials, the technique disclosed herein (calibration by measuring intensity while moving one of the surfaces) can be applied to more general situations where the lower surface has one or more optically thin films on it and the upper surface or the fluid are not perfectly transparent. For the more general cases, different equations may be used other than Equations (1) and (5) through (8).

To measure spacing with interferometry using the apparatus and equations described herein, a calibration process is greatly beneficial to determine the various optical losses and background (ambient) illumination in the system. Additionally, the calibration process helps to compensate for small variations in reflectance on different sliders or even different points on the same slider.

The calibration process is accomplished by altering the spacing between the slider and the disk by substantially at least λ/4 while simultaneously detecting the intensity using photo sensors 32, 36, and 38. Since the relationship given by Equation (1) between phase δ and intensity $I_{out}/I_{in}$ is periodic, the measurement of any of the peaks or valleys is identical to all the other peaks and valleys. Once the maximum and minimum intensities for each wavelength are measured, the system is calibrated. Future measurements of interferometric intensity are always referenced to the maximum and minimum interferometric intensities that were measured during the calibration. By referencing the measured intensity of illumination to the measured maximum and minimum intensity, factors such as optical losses in the system optics, ambient lighting, electronic gain in the detector circuits, and small variations in the reflectance of the surfaces are substantially eliminated from the calculations.

ITERATIVE PEAK DETECTION METHOD

A special iterative peak detection method was developed to extract the maximum and minimum interferometric intensities from the three color data measured during the calibration process. In the following paragraphs, the nature of the noise in the calibration signal is described together with the technique that was developed to extract the interferometric maximum and minimum from the signal.

The calibration data is subject to two significantly different types of "noise" that makes the detection of the maximum and minimum interferometric intensities difficult. The first type of noise is called "electronic" noise for the purpose of this disclosure. The electronic noise is predominantly caused by shot noise and thermal noise from the detector together with EMI from motor assemblies and other components in and near the Dynamic Flying Height Tester. The electronic noise tends to be symmetric, i.e. the noise will tend to increase and decrease the voltage signals in nearly equal amounts such that a time average of a noisy DC signal from the detector will tend to eliminate the electronic noise.

The second type of "noise" present in the calibration signal is called "vibration" noise for the purpose of this disclosure. Vibration noise is not actually noise but is a relatively high-frequency variation in the intensity that is caused by slider vibration during calibration. Since the interferometric intensity is a function of flying height, variations in flying height cause variations in interferometric intensity which appear as a type of "noise" in the calibration data. Near the maximum and minimum interferometric intensity, the vibration noise has a characteristic very different from the electronic noise. The vibration noise is not symmetric. The asymmetry in the vibration noise is a result of the non-linear relationship between intensity and spacing. Small perturbations from a spacing that produces a maximum intensity always decrease the intensity. I.e., at the maximum intensity, both an increase and a decrease in spacing will cause a reduction in interferometric intensity. Therefore, a time average of a noisy DC signal of maximum intensity from the detector will tend to be low due to vibration noise. Similarly, a time average of a minimum intensity signal will tend to be high due to vibration noise. The amount that the signals are low and high is a function of the slider vibration during calibration. Sliders that are perfectly stable experience no vibration noise and sliders that are unstable experience significant vibration noise.

Due to the vibration noise, typical peak detection techniques that use some type of low-pass filtering to reduce electronic noise do not work satisfactorily. The problem is that the low pass filtering causes the maximum intensity to be reduced due to the non-symmetric vibration noise. Due to the low-pass filtering of vibration noise, sliders that vibrate at different amplitudes can have significantly different measurements of maximum and minimum interferometric intensity even though the actual maximum and minimum intensity is identical.

In order to reduce electronic noise by averaging without significantly altering the maximum and minimum intensity due to vibration noise, the following iterative technique was developed.

Step 1. At a relatively high data rate, make many measurements of interferometric intensity for three colors while altering the spacing such that all three colors substantially go through a maximum and minimum of interferometric intensity (i.e., collect the calibration data for all three colors).

Step 2. Use any method to initially estimate the maximum and minimum interferometric intensity for each color. One such method to determine an initial estimate of the maximum and minimum intensities is to search the digitized data acquired in Step 1 for the highest and lowest measurement point for each color and use these values as the initial estimates for the maximum and minimum interferometric intensities for each color, respectively.

Step 3. Calculate the spacing for each measurement point made during Step 1 using the initial estimate (Step 2.) or the updated maximum and minimum intensity for each color (Step 6).

Step 4. For all intensity values in the calibration measurement close to (i.e. within a threshold value of) the maximum, calculate a new maximum using equation (9).

Step 5. For all intensity values in the calibration measurement close to (i.e. within a threshold value of) the minimum, calculate a new minimum using equation (10).

Step 6. Determine the new maximum and minimum intensity by averaging all the calculated maximum and minimum values from Steps 4 and 5.

Step 7. Check convergence of the maximum and minimum intensity for each color by comparing the new maximum and minimum for each color to the previous maximum and minimum for each color. If the maximum and minimum have converged, stop. If they have not, go back to Step 3.

$$I_{MAX,NEW} = I_{MIN} + \frac{(1 + \overline{I_{MEAS}})}{(1 + \overline{I_{THRY}})} (I_{MAX} - I_{MIN}) \quad (9)$$

$$I_{MIN,NEW} = I_{MAX} - \frac{(1 - \overline{I_{MEAS}})}{(1 - \overline{I_{THRY}})} (I_{MAX} - I_{MIN}) \quad (10)$$

The symbols $I_{MAX,NEW}$ and $I_{MIN,NEW}$ are updated values for maximum and minimum interferometric intensity, $I_{MAX}$ and $I_{MIN}$ are the previously existing values for maximum and minimum interferometric intensity, $\overline{I}_{MEAS}$ is the intensity measured at that calibration point, normalized to $-1$ and $+1$ which correspond to $I_{MIN}$ and $I_{MAX}$, and $\overline{I}_{THRY}$ is the theoretical intensity for the spacing at that point, normalized to a scale of $-1$ to $+1$.

One important aspect of this iterative method is that the intensity points at and close to the extrema during calibration are used to help calculate the extrema using the additional information that the spacing is approximately known at each point. For each iteration, the spacing is calculated based on the previous values of maximum and minimum fringe intensity for each color. Based upon the spacing calculations, an intelligent recalculation of maximum and minimum intensity is made so as to average out electronic noise and not alter the maximum and minimum values due to simple averaging of the vibration noise. cl METHOD INCLUDING A DECAY TERM IN EQUATION (1)

While Equation (1) is periodic, in practice, the peaks may tend to become lower and the valleys may tend to become higher as the spacing increases due to loss of coherence of the illumination and/or a reduction in the measured intensity of reflection off the slider caused by the angular changes in the slider position relative to the incoming light. The decay of amplitude of the intensity function can be compensated for by adding a decay term to Equation 1. With a decay term in Equation 1, it is important to know which peak or valley was measured during calibration since different peaks and valleys would be at different heights. Since the purpose of this machine is to measure spacing, it is not difficult to determine which peak is measured since the peak position is directly related to spacing. Therefore, this calibration process can be used even when there is a decay term in the spacing/intensity relationship. The details of this disclosure neglect the decay term in the intensity vs. spacing relationship. One such example of equation (1) with a decay term is:

$$\frac{I_{Out}}{I_{In}} = \left( \frac{r^2 + s^2 + 2rs\cos\delta}{1 + r^2 s^2 + 2rs\cos\delta} \right)(\alpha^\delta) \quad (1')$$

where $\alpha$ is in the range of from 0.0 to 1.0. Smaller values of $\alpha$ give higher decay rates, i.e., $I_{Out}/I_{In}$ gets smaller for higher values of $\delta$. More complicated decay terms which also control the shape of the decay may be used.

ANALYTIC METHOD TO DETERMINE FRINGE ORDER AND CALCULATE SPACING WITHOUT USING A LOOK UP TABLE

An alternative to the lookup table approach for calculating spacing and determining fringe order is described in the following paragraphs. The maximum and minimum values of intensity measured during calibration are used in order to scale the measured value of intensity into units consistent with $I_{Out}/I_{In}$ as used in Equation (1).

$$\frac{I_{Out}}{I_{In}} = \frac{(I_{MEAS} - I_{CALMIN})}{(I_{CALMAX} - I_{CALMIN})} (I_{THRYMAX} - I_{THRYMIN}) + I_{THRYMIN} \quad (11)$$

where $I_{MEAS}$=The intensity measured for which the spacing is desired;

$I_{CALMIN}$=The minimum intensity measured during calibration, i.e. $I_{CALMIN}=I_{MIN,NEW}$ determined from equation (10) upon completion of the iteration;

$I_{CALMAX}$=The maximum intensity measured during calibration, i.e. $I_{CALMAX}=I_{MAX,NEW}$ as determined from equation (9) upon completion of the iteration;

$I_{THRYMIN}$=The minimum intensity based on Equation (1) and the measured values of r and s;

$I_{THRYMAX}$=The maximum intensity based on Equation (1) and the measured values of r and s;

with $$I_{THRYMAX} = \frac{r^2 + s^2 + 2rs}{1 + r^2s^2 + 2rs} \quad (12)$$

$$I_{THRYMIN} = \frac{r^2 + s^2 - 2rs}{1 + r^2s^2 - 2rs} \quad (13)$$

Solving Equation (1) for $\delta$ yields $$\delta = \cos^{-1}\left(\frac{r^2 + s^2 - \frac{I_{Out}}{I_{In}} - r^2s^2 \frac{I_{Out}}{I_{In}}}{2rs\left(\frac{I_{Out}}{I_{In}} - 1\right)}\right) \quad (14)$$

Considering a single color measurement, the $\delta$ determined by Equation (14) is inserted into Equation (5) which can be solved for spacing yielding $$H_i = \frac{\gamma - \delta + i\pi}{4\pi n} \lambda \quad (15)$$

and $$H_{i+1} = \frac{\gamma + \delta + i\pi}{4\pi n} \lambda$$

for $i = 0,2,4,6$

Based on a single color measurement, there is no unique solution for the spacing H as shown by Equation (15). In order to determine a unique solution for the spacing, two or more different wavelengths are processed simultaneously.

Considering the case of three different wavelengths, a maximum and minimum calibration intensity is determined for each color by measuring the intensity while varying the spacing over a range that produces a maximum and minimum in interferometric intensity for all three wavelengths. Once the calibration values for all three colors are known, the intensity is measured to determine the spacing. Using the three values of measured intensity together with the three maximum and minimum calibration values, Equations (11)–(15) are used to determine a table of possible flying heights (spacings) based on the order i and the wavelength.

TABLE 2

| | Spacing for three different colors at different fringe orders i. | | |
|---|---|---|---|
| i | $H_1$ | $H_2$ | $H_3$ |
| 0 | 41 | 60 | 89 |
| 1 | 159 | 191 | 177 |
| 2 | 259 | 333 | 379 |
| 3 | 377 | 464 | 467 |
| 4 | 477 | 605 | 669 |
| 5 | 595 | 737 | 757 |
| 6 | 695 | 879 | 959 |
| 7 | 813 | 1010 | 1047 |

Note that when implementing equations (11)–(15) for the three different colors, different values are used for n and k for each of the colors with the result that each color will generally have different values for r, s, $\gamma$, and of course $\lambda$.

The spacing values in Table 2 are searched to determine one or more consistent flying heights. The flying heights for each of the three colors are generally not identical due to system imperfections and electronic noise. For this particular set of values, a consistent spacing occurs at $H_1$=477, $H_2$=464, and $H_3$=467. The average value of these spacings is 470 and the standard deviation is 5.9. Another possible set of consistent values occurs at $H_1$=159, $H_2$=191, and $H_3$=177. The average of these measurements is 175 and the standard deviation is 13.5. Since in this case the standard deviation of the measurement at 470 is significantly smaller than the measurement at 177, the correct flying height (spacing) is 470. Instead of a simple average of the three flying heights, the flying height may also be determined using a weighted average of the flying heights where the weight is based on the intensity signal-to-noise ratio of each color channel. Furthermore, the weight values may be dependent upon spacing because at different spacing values, the intensity vs. spacing curve has different slopes which affect the spacing signal to noise ratio. For example, near the minimum and maximum values of intensity, a small change in intensity results in a relatively large change in spacing. Therefore, where the intensity is near a maximum or minimum, the weighting may be selected to be lower than when the intensity is not near a maximum or minimum.

While in this case, one spacing value (470) was obviously better than the next best match (177), some flying heights have ambiguities where it is not possible to select one flying height simply based upon the agreement between the colors. The ambiguity exits because the three spacing vs. intensity curves are periodic and significantly different flying heights exist where the intensity of each of the three colors are nearly identical. When such situations occur, the spacing is altered in some manner such as changing the disk rpm in order to alter the spacing away from the ambiguous flying height. Once the flying height is determined in the altered situation, the intensities are repeatably measured at a high data rate while the disk rpm is brought back to the desired value. The set of points acquired are analyzed in sequence where each point is assumed to be within some range of the previous point. Using this method, the flying height is determined at the ambiguous flying height by perturbing the flying height to an unambiguous position then following the flying height back to the position of interest.

ROTARY LOAD/UNLOAD

In order to calibrate, the spacing between the slider and the disk must be altered in some manner. For this purpose, a rotary load/unload scheme is utilized. As shown in FIG. 8a, the slider 12 and spring 13 assembly is mounted on an arm 17 that is attached to a rotating spindle 7. The axis of rotation of 17 is aligned to be substantially in line with the flexure point on the spring 13 which is shown within the small circle, $C_R$, in FIG. 8c. By pivoting the mounted portion of the spring 13, the spring force which holds slider 12 against the disk 10 is reduced in a controlled manner. For the purpose of calibration as described herein, a partial unload is used where arm 17 pivots only enough to reduce the loading force on slider 12 such that the air bearing developed between the disk 10 and the slider 12 causes the spacing to increase as needed for calibration purposes. Alternatively, the calibration may also be performed by increasing the loading force on slider 12 such that the air bearing developed between the disk 10 and the slider 12 causes the spacing to decrease as needed for calibration purposes.

In addition to calibration, the rotary unloader is also useful for loading and unloading spring/slider assemblies from the rotating disk. Other machines that load and unload spring/slider assemblies from rotating disks for testing purposes typically utilize a blade or wire that physically pushes the spring away from the disk surface. However, due to the on-going miniaturization of hard disk drives and components, the space between the spring 13 and the disk 10 has reduced to the point where it is very difficult to keep the mechanisms that protrude between the spring and slider from either damaging the rotating disk or touching and/or disturbing the spring assembly. Therefore, the rotary unload technique described herein provides an advantage over other technologies for loading and unloading spring/slider assemblies from rotating disks. This load/unload concept may be applied not only to the Dynamic Flying Height Tester, but also to any other piece of test equipment that requires spring/slider assemblies to be loaded and unloaded from rotating disks. The rotary load/unload technique may be applied to electrical testers, drag testers, start/stop testers and any other kind of equipment or machinery that requires the slider to be unloaded in a precise and carefully controlled manner from a rotating or stationary disk surface.

CONTINUOUS MEASUREMENT APPLICATION

Figure 12:
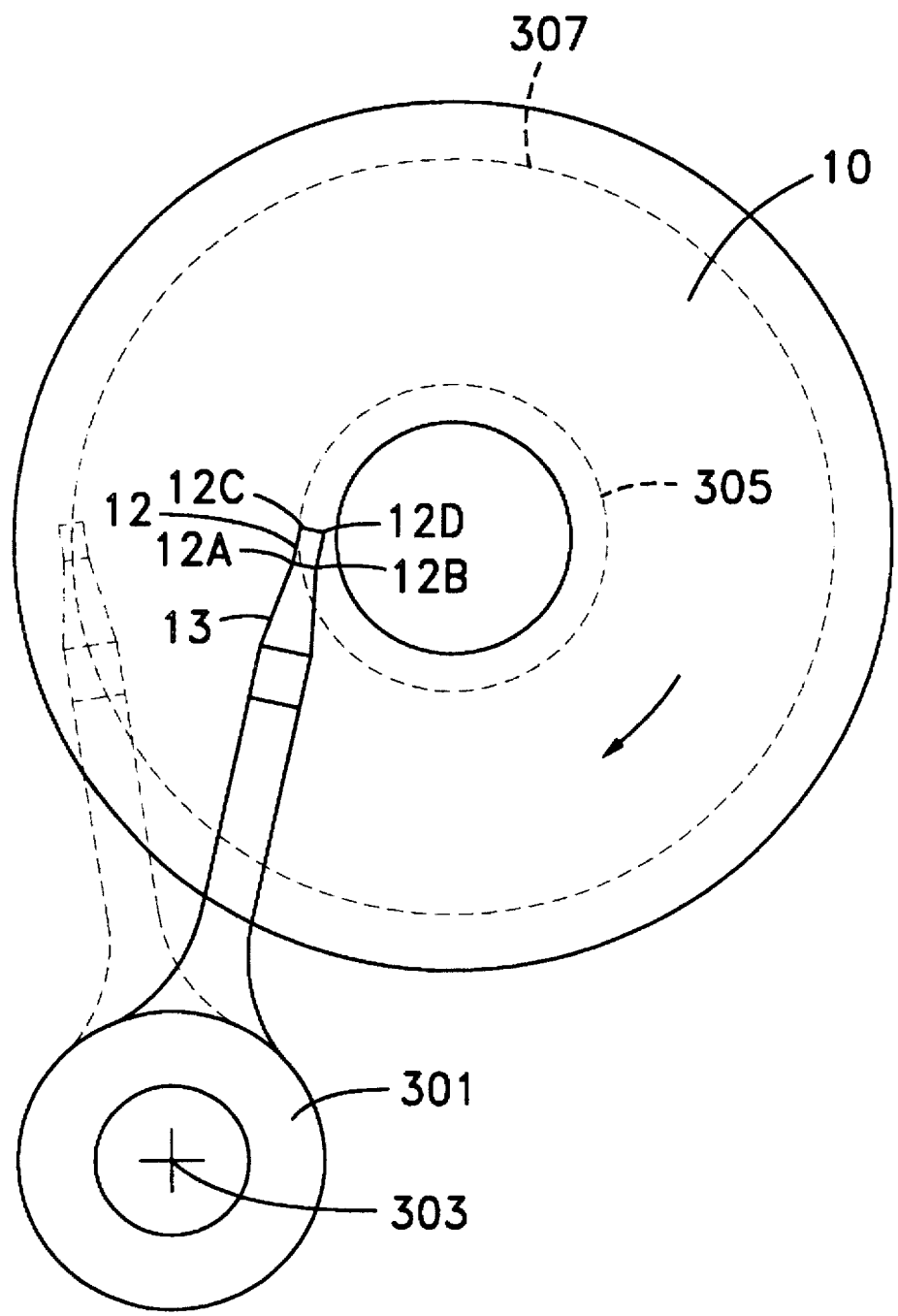
FIG. 12 illustrates the different geometries that the slider and disk take on at different disk radii when using a rotary actuator.
Figure 13:
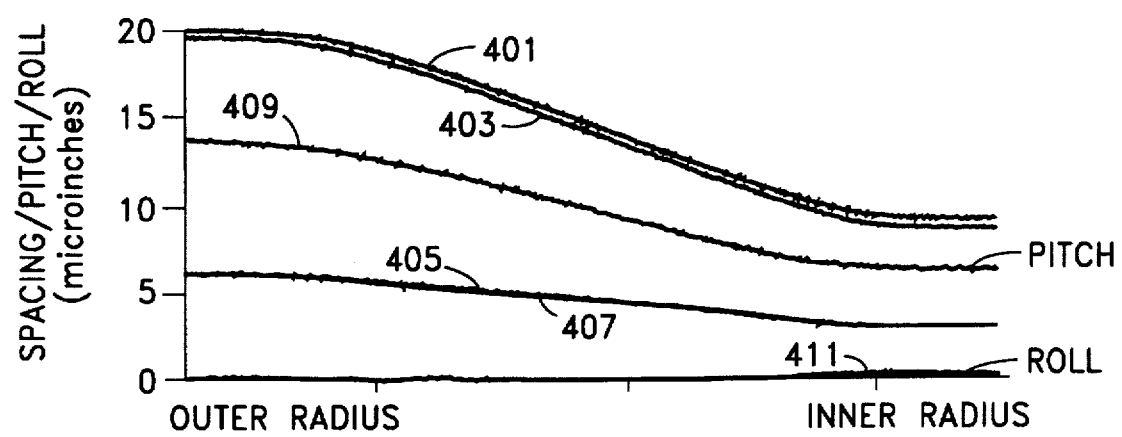
FIG. 13 illustrates measurements of slider/disk spacing, slider pitch and slider roll that were taken during a continuous slider/disk motion that is geometrically equivalent to the motion made during rotary actuation of the slider.

The high-speed data acquisition capabilities of the Dynamic Flying Height Tester allow it to be used for complete characterization of the slider flying position over all the different positions on the disk it assumes. FIG. 12 illustrates a typical rotary actuator as used on a hard disk drive for computer applications. The slider 12 and spring 13 assembly is mounted on the rotary arm 301 that pivots about point 303. In order to read the magnetic information that is encoded on different tracks which are located on different radii on the disk, the rotary actuator moves to position the spring/slider assembly at the proper position on the disk. As the slider moves from the inner track 305 to the outer track 307, the disk surface speed relative to the slider changes. In addition, the slider angle (skew angle) relative to a radial line around the disk changes. Since the slider must operate under a range of disk radii and skew angles, it is useful to be able to characterize the slider throughout the range of operational skew and radius positions. FIG. 13 shows flying height measurements that were made on the Dynamic Flying Height Tester while moving the disk in an arc motion which is geometrically equivalent to the range of radius and skew that the slider experiences due to the rotary actuator mechanics of a typical disk drive as shown in FIG. 12. While continuously moving over the range of radius and skew, over 1000 measurements of flying height were made at the four corner positions of the slider. Typical data taken during such a continuous scan are presented in FIG. 13. Line 401 indicates the flying height or spacing between the leading outer corner of the slider 12A and the disk. Line 403 indicates the flying height at the leading inner corner 12B of the slider. Line 405 indicates the flying height at the outer trailing edge 12C of the slider and line 407 indicates the flying height at the inner trailing edge 12D of the slider. In addition to the raw data of flying height at the corners, the pitch and roll of the slider is also plotted. Line 409 shows the pitch which was calculated by subtracting the average trailing edge flying height from the average leading edge trailing height. Line 411 shows the roll which was calculated by taking the difference between the inner and outer trailing edge flying heights. The high speed capability of the Dynamic Flying Height Tester allows it to quickly measure a large number of data points in a continuous mode that characterizes the range of slider radii and skew positions.

Both the Dynamic Flying Height Tester and the Interferometric Micro-hardness Tester illustrate ways that the Method to Calibrate Intensity for Interferometric Measurement of Small Spacing can be used. The feasibility of the measurement has been demonstrated by the measurements of flying height illustrated herein. It will be understood that the apparatus and method of the present invention to calibrate intensity and determine fringe order for interferometric measurement of small spacings may be employed with many types of devices including flying height testers. Thus, there are numerous other embodiments of the invention which will be obvious to one skilled in the art, including but not limited to hardness testers, electrical testers, drag testers, start/stop testers and any other kind of equipment or machinery that requires the slider to be unloaded in a precise and carefully controlled manner from a rotating or stationary disk surface. The apparatus and method of the present invention may be embodied in other specific forms without departing form its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A method for measuring the dimension of a small space comprising:

(a) directing light having a plurality of wavelengths across a small spacing;

(b) detecting interference signals generated by reflection of said light from said small spacing;

(c) measuring and recording a first wavelength interference signal for a first wavelength of said plurality of wavelengths and a second wavelength interference signal for a second wavelength of said plurality of wavelengths for a range of dimensions by altering said small spacing over a range which produces a maximum and a minimum in intensity for each of said first and second wavelength interference signals;

(d) estimating an initial maximum interferometric intensity and an initial minimum interferometric intensity for each of said first and second wavelength interference signals;

(e) calculating a spacing which corresponds to each of multiple measurement points on said first and second wavelength interference signals using said initial maximum and minimum interferometric intensity estimates;

(f) calculating a plurality of new maximum interferometric intensities for a plurality of said multiple measurement points on said first and second wavelength interference signals which are within a threshold value of said initial maximum interferometric intensity for each of said first and second wavelength interference signals in accordance with the expression:

$$I_{MIN,NEW} = I_{MAX} - \frac{(1 - \overline{I_{MAX,MEAS}})}{(1 - \overline{I_{MAX,THRY}})} (I_{MAX} - I_{MIN})$$

where $I_{MAX,NEW}$ is said new maximum interferometric intensity, $I_{MAX}$ and $I_{MIN}$ are said initial maximum and minimum interferometric intensities, $\overline{I_{MAX,MEAS}}$ is an interferometric intensity measured at one of said plurality of multiple measurement points within said threshold value of said initial maximum interferometric intensity, normalized to $-1$ and $+1$ which correspond to $I_{MIN}$ and $I_{MAX}$, and $\overline{I_{MAX,THRY}}$ is a theoretical interferometric intensity for a spacing corresponding to said one of said plurality of said multiple measurement points within said threshold value of said initial maximum interferometric intensity, normalized to a scale of $-1$ and $+1$;

(g) calculating a plurality of new minimum interferometric intensities for a plurality of said multiple measurement points on said first and second wavelength interference signals which are within a threshold value of said initial minimum interferometric intensity for each of said first and second wavelength interference signals in accordance with the expression:

$$I_{MIN,NEW} = I_{MAX} - \frac{(1 - \overline{I_{MAX,MEAS}})}{(1 - \overline{I_{MAX,THRY}})} (I_{MAX} - I_{MIN})$$

where $I_{MIN,NEW}$ is said new minimum interferometric intensity, $I_{MAX}$ and $I_{MIN}$ are said initial maximum and minimum interferometric intensities, $I_{MIN,MEAS}$ is an interferometric intensity measured at one of said plurality of multiple measurement points within said threshold value of said initial minimum interferometric intensity, normalized to $-1$ and $+1$ which correspond to $I_{MIN}$ and $I_{MAX}$, and $\overline{I_{MIN,THRY}}$ is a theoretical interferometric intensity for a spacing corresponding to said one of said plurality of said multiple measurement points within said threshold value of said initial minimum interferometric intensity, normalized to a scale of $-1$ to $+1$;

(h) averaging said plurality of new minimum interferometric intensities for said plurality of said multiple measurements of said interferometric intensity within said threshold value of said initial minimum interferometric intensity and averaging said plurality of new maximum interferometric intensities for said plurality of said multiple measurements of said interferometric intensity within said threshold value of said initial maximum interferometric intensity to determine a new average maximum interferometric intensity and a new average minimum interferometric intensity, respectively; and (i) comparing said new average maximum interferometric intensity and said new average minimum interferometric intensity with said initial maximum interferometric intensity and said initial minimum interferometric intensity, respectively, for each of said first and second wavelength interference signals.

2. A method as defined in claim 1 further comprising the step of: (j) checking for convergence of said new average maximum interferometric intensity and said new average minimum interferometric intensity with said initial maximum interferometric intensity and said initial minimum interferometric intensity for each of said first and second wavelength interference signals.

3. A method as defined in claim 2 further comprising the step of: (k) repeating steps (e) through (j) if the test for convergence in step (j) is negative using said new average maximum interferometric intensity and said new average minimum interferometric intensity in place of said initial maximum interferometric intensity and said initial minimum interferometric intensity.

4. A method as defined in claim 1 further comprising the step of determining said initial maximum interferometric intensity and said initial minimum interferometric intensity by searching said multiple measurement points acquired by step (e) for a highest and a lowest measurement point for each of said first and second wavelength interference signals and using said highest and lowest measurement point values as said initial estimates for said maximum and minimum interferometric intensities for each of said first and second wavelengths, respectively.

5. An interferometric method for measuring the dimension of a small spacing comprising:

directing light having a plurality of wavelengths across said small spacing;

detecting interference signals generated by reflection of said light from said spacing;

separating each of said interference signals according to its wavelength;

measuring and recording the interference signal intensity at two or more of said plurality of wavelengths for a range of spacing by altering said spacing over a range which produces a maximum and a minimum in intensity for each of said plurality of wavelengths;

measuring and recording the interference signal intensity produced by said spacing for each of said plurality of wavelengths;

constructing a table having multiple periodic spacing dimensions for each of said plurality of wavelengths, wherein each of said multiple periodic spacing dimensions corresponds to said measured and recorded interference signal intensity for each of said plurality of wavelengths, respectively; and comparing said multiple periodic spacing dimensions for one of said plurality of wavelengths with said multiple periodic spacing dimensions for the remaining of said plurality of wavelengths to determine the correct spacing dimension.

6. An interferometric apparatus for measuring the dimensions of a small spacing, said apparatus comprising:

a light source for producing light having a first wavelength and a second wavelength;

optics for directing said first and second wavelengths of light to a spacing having a separation distance, said spacing defined by first and second boundaries, such that light reflected from said first and second boundaries produces a first wavelength interference signal and a second wavelength interference signal, said first and second wavelength interference signals having characteristics determined by said separation distance;

a detector for measuring the intensities of said first and second wavelength interference signals;

a calibration controller for changing said separation distance while acquiring first and second calibration fringe patterns corresponding to said first and second wavelengths; and a processor for analyzing said measured intensities of said first and second wavelength interference signals corresponding to said separation distance and deriving therefrom said separation distance, said processor further comprising:

a table having multiple periodic spacing dimensions for each of said measured intensities of said first and second wavelength interference signals, wherein each of said multiple periodic spacing dimensions for said first wavelength corresponds to said measured intensity of said first wavelength interference signal and each of said multiple periodic spacing dimensions for said second wavelength corresponds to said measured intensity of said second wavelength interference signal; and a comparator which compares said table entries for said multiple periodic spacing dimensions for said first wavelength with said table entries for multiple periodic spacing dimensions for said second wavelength to determine the correct spacing dimension.

7. A method for measuring the dimension of a small spacing comprising:

(a) directing light having a plurality of wavelengths across a small spacing;

(b) detecting interference signals generated by reflection of said light from said small spacing;

(c) measuring and recording a first wavelength interference signal for a first wavelength of said plurality of wavelengths and a second wavelength interference signal for a second wavelength of said plurality of wavelengths for a range of dimensions by altering said small spacing over a range which produces a maximum and a minimum in intensity for each of said first and second wavelength interference signals;

(d) estimating an initial maximum interferometric intensity and an initial minimum interferometric intensity for each of said first and second wavelength interference signals;

(e) estimating an initial spacing value which corresponds to each of said initial maximum interferometric intensity and said initial minimum interferometric intensity for each of said first and second wavelength interference signals;

(f) calculating a new maximum interferometric intensity and a new minimum interferometric intensity for each of said first and second wavelength interference signals using said estimates of said initial spacing values which correspond to each of said initial maximum interferometric intensity and said initial minimum interferometric intensity for each of said first and second wavelength interference signals; and (g) comparing said new maximum interferometric intensity and said new maximum interferometric intensity with said initial maximum interferometric intensity and said initial minimum interferometric intensity, respectively, for each of said first and second wavelength interferences signals.

8. A method as defined in claim 7 further comprising the step of: (h) checking for convergence of said new maximum interferometric intensity and said new minimum interferometric intensity with said initial maximum interferometric intensity and said initial minimum interferometric intensity for each of said first and second wavelength interference signals.

9. A method as defined in claim 8 further comprising the step of: (i) repeating steps (e) through (h) if the test for convergence in step (h) is negative using said new average maximum interferometric intensity and said new average minimum interferometric intensity in place of said initial maximum interferometric intensity and said initial minimum interferometric intensity.

10. A method as defined in claim 7 further comprising the step of determining said initial maximum interferometric intensity and said initial minimum interferometric intensities by searching said first and second wavelength interference signals for a highest and lowest measurement point value and using said highest and lowest measurement point values as said initial estimates for said maximum and minimum interferometric intensities for each of said first and second wavelengths, respectively.

* * * * *

UNITED STATES PATENT AND TRADEMARK OFFICE
CERTIFICATE OF CORRECTION

PATENT NO. : 5,457,534  
DATED : October 10, 1995  
INVENTOR(S) : Christopher Lacey and Edward W. Ross It is certified that error appears in the above-indentified patent and that said Letters Patent is hereby corrected as shown below:

In column 26, line 55, that portion reading "space" should read --spacing--;

In column 27, lines 17-21, that portion reading $$I_{MIN,NEW} = I_{MAX} - \frac{(1 - \overline{I_{MAX,MEAS}})}{(1 - \overline{I_{MAX,THRY}})} (I_{MAX} - I_{MIN})$$

should read $$--I_{MAX,NEW} = I_{MIN} + \frac{(1 + \overline{I_{MAX,MEAS}})}{(1 + \overline{I_{MAX,THRY}})} (I_{MAX} - I_{MIN}) --;$$

In column 27, line 34, that portion reading "and" should read --to--;

In column 27, lines 42-46, that portion reading $$I_{MIN,NEW} = I_{MAX} - \frac{(1 - \overline{I_{MAX,MEAS}})}{(1 - \overline{I_{MAX,THRY}})} (I_{MAX} - I_{MIN})$$

should read $$--I_{MIN,NEW} = I_{MAX} - \frac{(1 - \overline{I_{MIN,MEAS}})}{(1 - \overline{I_{MIN,THRY}})} (I_{MAX} - I_{MIN}) --;$$

UNITED STATES PATENT AND TRADEMARK OFFICE
CERTIFICATE OF CORRECTION

PATENT NO. : 5,457,534
DATED : October 10, 1995
INVENTOR(S) : Christopher Lacey and Edward W. Ross It is certified that error appears in the above-indentified patent and that said Letters Patent is hereby corrected as shown below:

In column 28, line 29, that portion reading "acquired by" should read --acquired in--;
    In column 30, line 20, that portion reading "and said new maximum" should read --and said new minimum--;
    In column 30, line 24, that portion reading "interferences" should read --interference--; and
    In column 30, line 42, that portion reading "for a highest and lowest" should read --for a highest and a lowest--.

Signed and Sealed this

Fifteenth Day of October, 1996

Attest:

BRUCE LEHMAN

*Attesting Officer*     *Commissioner of Patents and Trademarks*